US008072429B2

(12) United States Patent  
Grivna

(10) Patent No.: US 8,072,429 B2
(45) Date of Patent: Dec. 6, 2011

(54) MULTI-AXIAL TOUCH-SENSOR DEVICE WITH MULTI-TOUCH RESOLUTION

(75) Inventor: Edward L. Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 907 days.

(21) Appl. No.: 11/731,893

(22) Filed: Mar. 29, 2007

(65) Prior Publication Data

US 2008/0150906 A1    Jun. 26, 2008

Related U.S. Application Data

(60) Provisional application No. 60/876,700, filed on Dec. 22, 2006.

(51) Int. Cl.
*G06F 3/41* (2006.01)
(52) U.S. Cl. ........................................................ 345/173
(58) Field of Classification Search .......... 345/156–179; 178/18.01–19.07
See application file for complete search history.

(56) References Cited

U.S. PATENT DOCUMENTS

| | | | |
|---|---|---|---|
| 3,922,093 A | 11/1975 | Dandliker et al. | |
| 4,090,092 A | 5/1978 | Serrano | |
| 4,186,392 A | 1/1980 | Holz | |
| 4,233,522 A | 11/1980 | Grummer et al. | |
| 4,293,734 A | 10/1981 | Pepper, Jr. | |
| 4,546,347 A | 10/1985 | Kirsch | |
| 4,671,153 A | 6/1987 | Peyre | |
| 4,686,332 A | 8/1987 | Greanias et al. | |
| 4,736,191 A | 4/1988 | Matzke et al. | |
| 4,799,055 A | 1/1989 | Nestler et al. | |
| 5,288,993 A | 2/1994 | Bidiville et al. | |
| 5,305,017 A | 4/1994 | Gerpheide | |
| 5,347,132 A * | 9/1994 | Holzman et al. | ............... 250/389 |
| 5,374,787 A | 12/1994 | Miller et al. | |
| 5,473,344 A | 12/1995 | Bacon et al. | |
| 5,483,261 A * | 1/1996 | Yasutake | ..................... 345/173 |
| 5,488,204 A | 1/1996 | Mead et al. | |
| 5,495,077 A | 2/1996 | Miller et al. | |
| 5,543,588 A | 8/1996 | Bisset et al. | |
| 5,543,590 A | 8/1996 | Gillespie et al. | |
| 5,543,591 A | 8/1996 | Gillespie et al. | |
| 5,565,658 A | 10/1996 | Gerpheide et al. | |
| 5,578,813 A | 11/1996 | Allen et al. | |
| 5,644,139 A | 7/1997 | Allen et al. | |
| 5,646,377 A | 7/1997 | Oda | |
| 5,648,642 A | 7/1997 | Miller et al. | |

(Continued)

OTHER PUBLICATIONS

Ryan Seguine, et al., "Layout Guidelines for PSoC™ CapSense™", Cypress Application Note AN2292, Revision B, Oct. 31, 2005, pp. 1-15.

(Continued)

*Primary Examiner* — Sumati Lefkowitz
*Assistant Examiner* — Rodney Amadiz

(57) ABSTRACT

An apparatus and a method for resolving locations of two or more substantially simultaneous touches on a touch-sensor device. The method may include detecting presences of two or more substantially simultaneous touches on a touch-sensor device at respective locations on the touch-sensor device, and resolving locations of two or more substantially simultaneous touches on the touch-sensor device. The apparatus may include a first set of sensor elements disposed in a first axis, a second set of sensor elements disposed in a second axis, and a third set of sensor elements disposed in a third axis.

31 Claims, 14 Drawing Sheets

U.S. PATENT DOCUMENTS

| | | | |
|---|---|---|---|
| 5,703,356 A | 12/1997 | Bidiville et al. | |
| 5,729,008 A | 3/1998 | Blalock et al. | |
| 5,729,009 A | 3/1998 | Dandliker et al. | |
| 5,748,185 A | 5/1998 | Stephan et al. | |
| 5,786,804 A | 7/1998 | Gordon | |
| 5,825,044 A | 10/1998 | Allen et al. | |
| 5,825,352 A | 10/1998 | Bisset et al. | |
| 5,841,078 A | 11/1998 | Miller et al. | |
| 5,854,482 A | 12/1998 | Bidiville et al. | |
| 5,861,583 A | 1/1999 | Schediwy et al. | |
| 5,869,790 A | 2/1999 | Shigetaka et al. | |
| 5,880,411 A | 3/1999 | Gillespie et al. | |
| 5,889,236 A | 3/1999 | Gillespie et al. | |
| 5,907,152 A | 5/1999 | Dandliker et al. | |
| 5,914,465 A | 6/1999 | Allen et al. | |
| 5,943,052 A | 8/1999 | Allen et al. | |
| 5,952,998 A | 9/1999 | Clancy et al. | |
| 5,963,197 A | 10/1999 | Bacon et al. | |
| 5,986,224 A * | 11/1999 | Kent | 178/18.04 |
| 5,994,710 A | 11/1999 | Knee et al. | |
| 6,002,594 A | 12/1999 | Ledin et al. | |
| 6,028,271 A | 2/2000 | Gillespie et al. | |
| 6,031,218 A | 2/2000 | Piot et al. | |
| 6,037,643 A | 3/2000 | Knee | |
| 6,037,929 A | 3/2000 | Ogura et al. | |
| 6,057,540 A | 5/2000 | Gordon et al. | |
| 6,097,371 A | 8/2000 | Siddiqui et al. | |
| 6,147,680 A | 11/2000 | Tareev | |
| 6,151,015 A | 11/2000 | Badyal et al. | |
| 6,172,354 B1 | 1/2001 | Adan et al. | |
| 6,188,391 B1 | 2/2001 | Seely et al. | |
| 6,225,617 B1 | 5/2001 | Dandliker et al. | |
| 6,233,368 B1 | 5/2001 | Badyal et al. | |
| 6,239,389 B1 | 5/2001 | Allen et al. | |
| 6,262,717 B1 | 7/2001 | Donohue et al. | |
| 6,281,881 B1 | 8/2001 | Siddiqui et al. | |
| 6,281,882 B1 | 8/2001 | Gordon et al. | |
| 6,326,950 B1 | 12/2001 | Liu | |
| 6,330,057 B1 | 12/2001 | Lederer et al. | |
| 6,351,257 B1 | 2/2002 | Liu | |
| 6,380,931 B1 | 4/2002 | Gillespie et al. | |
| 6,396,479 B2 | 5/2002 | Gordon | |
| 6,411,344 B2 | 6/2002 | Fujii et al. | |
| 6,414,671 B1 | 7/2002 | Gillespie et al. | |
| 6,421,045 B1 | 7/2002 | Venkat et al. | |
| 6,424,407 B1 | 7/2002 | Kinrot et al. | |
| 6,433,780 B1 | 8/2002 | Gordon et al. | |
| 6,452,683 B1 | 9/2002 | Kinrot et al. | |
| 6,455,840 B1 | 9/2002 | Oliver et al. | |
| 6,462,330 B1 | 10/2002 | Venkat et al. | |
| 6,476,970 B1 | 11/2002 | Smith | |
| 6,529,184 B1 | 3/2003 | Julienne | |
| 6,535,203 B2 | 3/2003 | Shigetaka et al. | |
| 6,585,158 B2 | 7/2003 | Norskog | |
| 6,597,347 B1 * | 7/2003 | Yasutake | 345/173 |
| 6,603,111 B2 | 8/2003 | Dietz et al. | |
| 6,608,585 B2 | 8/2003 | Benitz | |
| 6,610,936 B2 | 8/2003 | Gillespie et al. | |
| 6,621,483 B2 | 9/2003 | Wallace et al. | |
| 6,657,184 B2 | 12/2003 | Anderson et al. | |
| 6,664,948 B2 | 12/2003 | Crane et al. | |
| 6,674,475 B1 | 1/2004 | Anderson | |
| 6,677,929 B2 | 1/2004 | Gordon et al. | |
| 6,703,599 B1 | 3/2004 | Casebolt et al. | |
| 6,704,005 B2 | 3/2004 | Kato et al. | |
| 6,737,636 B2 | 5/2004 | Dietz et al. | |
| 6,750,852 B2 | 6/2004 | Gillespie et al. | |
| 6,774,351 B2 | 8/2004 | Black | |
| 6,774,915 B2 | 8/2004 | Rensberger | |
| 6,795,056 B2 | 9/2004 | Norskog et al. | |
| 6,809,723 B2 | 10/2004 | Davis | |
| 6,819,314 B2 | 11/2004 | Black | |
| 6,823,077 B2 | 11/2004 | Dietz et al. | |
| 6,825,890 B2 | 11/2004 | Matsufusa | |
| 6,970,160 B2 * | 11/2005 | Mulligan et al. | 345/173 |
| 6,992,601 B2 | 1/2006 | Chiu et al. | |
| 7,030,860 B1 | 4/2006 | Hsu et al. | |
| 7,046,230 B2 | 5/2006 | Zadesky et al. | |
| 7,119,323 B1 | 10/2006 | Brosnan et al. | |
| 7,239,302 B2 | 7/2007 | Kim | |
| 7,248,345 B2 | 7/2007 | Todoroff et al. | |
| 7,382,139 B2 * | 6/2008 | Mackey | 324/660 |
| 7,423,635 B2 | 9/2008 | Taylor et al. | |
| 7,450,113 B2 | 11/2008 | Gillespie et al. | |
| 7,463,246 B2 | 12/2008 | Mackey | |
| 7,466,307 B2 | 12/2008 | Trent, Jr. et al. | |
| 7,479,949 B2 | 1/2009 | Jobs et al. | |
| 7,548,073 B2 | 6/2009 | Mackey et al. | |
| 7,663,607 B2 | 2/2010 | Hotelling et al. | |
| 7,728,377 B2 | 6/2010 | Elsass et al. | |
| 7,808,255 B2 | 10/2010 | Hristov et al. | |
| 7,812,829 B2 | 10/2010 | Gillespie et al. | |
| 7,821,274 B2 | 10/2010 | Philipp | |
| 7,821,502 B2 | 10/2010 | Hristov | |
| 7,825,905 B2 | 11/2010 | Philipp | |
| 7,907,127 B2 | 3/2011 | Gillespie et al. | |
| 7,911,456 B2 | 3/2011 | Gillespie et al. | |
| 7,920,129 B2 | 4/2011 | Hotelling et al. | |
| 7,948,477 B2 | 5/2011 | Hotelling | |
| 2002/0133310 A1 * | 9/2002 | Tamura | 702/139 |
| 2003/0037966 A1 * | 2/2003 | Sandbach | 178/18.05 |
| 2006/0032680 A1 | 2/2006 | Elias et al. | |
| 2006/0066582 A1 | 3/2006 | Lyon et al. | |
| 2006/0091301 A1 * | 5/2006 | Trisnadi et al. | 250/226 |
| 2006/0097991 A1 | 5/2006 | Hotelling et al. | |
| 2006/0139340 A1 * | 6/2006 | Geaghan | 345/177 |
| 2007/0097991 A1 | 5/2007 | Tatman | |
| 2007/0109279 A1 * | 5/2007 | Sigona | 345/177 |
| 2007/0229469 A1 | 10/2007 | Seguine | |
| 2007/0229470 A1 | 10/2007 | Snyder et al. | |
| 2007/0247443 A1 | 10/2007 | Philipp | |
| 2007/0257893 A1 | 11/2007 | Philipp | |
| 2007/0279395 A1 | 12/2007 | Philipp et al. | |
| 2008/0122976 A1 | 5/2008 | Kubota | |
| 2008/0309633 A1 | 12/2008 | Hotelling et al. | |
| 2010/0019780 A1 * | 1/2010 | Bulea | 324/662 |
| 2010/0066701 A1 * | 3/2010 | Ningrat | 345/174 |

OTHER PUBLICATIONS

Dennis Seguine, "Capacitive Switch Scan", Cypress Application Note AN2233a, Revision B, Apr. 14, 2005, pp. 1-6.

Dave Van Ess, "Understanding Switched Capacitor Analog Blocks", Cypress Application Note AN2041, Revision B, Mar. 30, 2004, pp. 1-1.

Mark Lee, "CapSense Best Practices", Cypress Application Note AN2394, Rev.**, Oct. 19, 2006, pp. 1-10.

CSR User Module Data Sheet, CSR v1.0, CY8C21x34 Data Sheet, Oct. 6, 2006, pp. 1-36.

CSD User Module Data Sheet, CSD v1.0, Oct. 23, 2006, pp. 1-58.

Wayne Westerman, "Hand Tracking, Finger Identification, and Chordic Manipulation on a Multi-Touch Surface," Spring 1999, pp. i-xxx and 1-333.

USPTO Notice of Allowance for U.S. Appl. No. 11/261,316 dated Aug. 23, 2006; 6 pages.

USPTO Non-Final Rejection for U.S. Appl. No. 11/261,316 dated Jun. 6, 2006; 6 pages.

USPTO Notice of Allowance for U.S. Appl. No. 11/268,898 dated Apr. 19, 2007; 9 pages.

USPTO Final Rejection for U.S. Appl. No. 11/605,506 dated Dec. 21, 2010; 14 pages.

USPTO Advisory Action for U.S. Appl. No. 11/605,506 dated Apr. 12, 2010; 3 pages.

USPTO Final Rejection for U.S. Appl. No. 11/605,506 dated Feb. 3, 2010; 14 pages.

USPTO Non-Final Rejection for U.S. Appl. No. 11/605,506 dated Aug. 11, 2009; 11 pages.

USPTO Final Rejection for U.S. Appl. No. 11/605,819 dated Feb. 2, 2010; 15 pages.

USPTO Non-Final Rejection for U.S. Appl. No. 11/605,819 dated Aug. 11, 2009; 12 pages.

* cited by examiner

MULTI-AXIAL TOUCH-SENSOR DEVICE WITH MULTI-TOUCH RESOLUTION

RELATED APPLICATION

This application claims the benefit of U.S. Provisional Application No. 60/876,700, filed Dec. 22, 2006.

TECHNICAL FIELD

This invention relates to the field of user interface devices and, in particular, to touch-sensor devices.

BACKGROUND

Computing devices, such as notebook computers, personal data assistants (PDAs), kiosks, and mobile handsets, have user interface devices, which are also known as human interface devices (HID). One user interface device that has become more common is a touch-sensor pad (also commonly referred to as a touchpad). A basic notebook computer touch-sensor pad emulates the function of a personal computer (PC) mouse. A touch-sensor pad is typically embedded into a PC notebook for built-in portability. A touch-sensor pad replicates mouse X/Y movement by using two defined axes which contain a collection of sensor elements that detect the position of a conductive object, such as a finger. Mouse right/left button clicks can be replicated by two mechanical buttons, located in the vicinity of the touchpad, or by tapping commands on the touch-sensor pad itself. The touch-sensor pad provides a user interface device for performing such functions as positioning a pointer, or selecting an item on a display. These touch-sensor pads may include multi-dimensional sensor arrays for detecting movement in multiple axes. The sensor array may include a one-dimensional sensor array, detecting movement in one axis. The sensor array may also be two dimensional, detecting movements in two axes.

One type of touchpad operates by way of capacitance sensing utilizing capacitance sensors. The capacitance detected by a capacitance sensor changes as a function of the proximity of a conductive object to the sensor. The conductive object can be, for example, a stylus or a user's finger. In a touch-sensor device, a change in capacitance detected by each sensor in the X and Y dimensions of the sensor array due to the proximity or movement of a conductive object can be measured by a variety of methods. Regardless of the method, usually an electrical signal representative of the capacitance detected by each capacitive sensor is processed by a processing device, which in turn produces electrical or optical signals representative of the position of the conductive object in relation to the touch-sensor pad in the X and Y dimensions. A touch-sensor strip, slider, or button operates on the same capacitance-sensing principle.

Another user interface device that has become more common is a touch screen. Touch screens, also known as touchscreens, touch panels, or touchscreen panels are display overlays which are typically either pressure-sensitive (resistive), electrically-sensitive (capacitive), acoustically-sensitive (surface acoustic wave (SAW)) or photo-sensitive (infra-red). The effect of such overlays allows a display to be used as an input device, removing the keyboard and/or the mouse as the primary input device for interacting with the display's content. Such displays can be attached to computers or, as terminals, to networks. There are a number of types of touch screen technologies, such as optical imaging, resistive, surface acoustical wave, capacitive, infrared, dispersive signal, piezoelectric, and strain gauge technologies. Touch screens have become familiar in retail settings, on point of sale systems, on ATMs, on mobile handsets, on kiosks, on game consoles, and on PDAs where a stylus is sometimes used to manipulate the graphical user interface (GUI) and to enter data.

A first type of conventional touchpad is composed of a matrix of rows and columns. Within each row or column there are multiple sensor elements. However, all sensor pads within each row or column are coupled together and operate as one long sensor element. The number of touches a touchpad can detect is not the same as the resolution of the touchpad. For example, even though a conventional touchpad may have the capability to detect two substantially simultaneous touches with an XY matrix, the conventional touchpad cannot resolve the location of the two substantially simultaneous touches. The only conventional way to resolve the location of a second touch is if the touches arrive sequentially in time. This allows the remaining three potential locations to be evaluated to determine which locations are "actual touch" locations and which are "ghost touch" locations. If both touches arrive or are detected substantially simultaneously, there is no way to resolve which of the two pairs of potential locations are "actual" touches, instead of "ghost" touches. Thus, the conventional two-axis touchpads are configured to resolve only a location of a single touch.

FIG. 1A illustrates a detection profile 100 of a single touch 101 with the first type of conventional touchpad 110 noted above, as detected when scanning the rows and columns of an XY matrix. The location of the touch 101 on the Y-axis is determined from the calculated centroid of additional capacitance (e.g., $1^{st}$ maximum 121) of the scanned rows in the matrix, and the location on the X-axis is determined from the calculated centroid of additional capacitance (e.g., $1^{st}$ maximum 131) of the scanned columns of the same matrix. When a second touch 102 occurs, a second maximum (e.g., $2^{nd}$ maximum 122 and $2^{nd}$ maximum 132) is introduced on each axis, as shown in FIG. 1B. The second touch 102 possibly introduces two "ghost touch" locations 103, introducing multiple potential touch combinations.

From these dual-maxima, it is possible to infer the following as potential touch combinations that could generate the detected touch response: two fingers, one on each of the black circles; two fingers, one on each of the hashed circles; three fingers, at any combination of the four circles (four possible combinations); four fingers, one at each circle.

Of these seven possible combinations, it may not be possible to determine a) which of them is the present touch type, and b) (with the exception of the four finger combination) where the real touches are located.

A second type of conventional touchpad is composed of an XY array of independent sense elements, where each sensor element in a row or column is separately sensed. Here each row and column is composed of multiple sensing elements, each capable of independent detection of a capacitive presence and magnitude. These may then be used to detect any number of substantially simultaneous touches. The drawback to this second type of conventional touchpad is the sheer number of elements that must be independently sensed, scanned, and evaluated for capacitive presence. For example, the first type of conventional touchpad including an array of ten by ten coupled sensor elements would require sensing and evaluation of twenty elements (ten rows and ten columns) to determine presence and location of touch. This same area, implemented as an all-points-addressable (APA) array (i.e., second type of conventional touchpad), would require one hundred evaluations (10×10=100) to also determine the location of a single touch, which is five times the number of the first type of conventional touchpad.

In addition to the processing and scanning time requirements of the second type of conventional touchpad, there is also the issue of physical routing. In an XY row/column arrangement, it is possible to use the sensing elements themselves as a significant part of the routing (at least for those parts occurring within the touch sensing area). With an APA array, each sensed location requires a separate wire or trace between the sensor element and the controller containing the capacitance sensing circuitry connected to the touchpad. In larger arrays, this can consume large routing resources. When implemented on transparent touch screens (where vias are not normally supported), it may not be physically possible to route all necessary sensor elements to the edge of the sensing grid to allow connection to a capacitance sensing controller.

BRIEF DESCRIPTION OF THE DRAWINGS

The present invention is illustrated by way of example, and not by way of limitation, in the figures of the accompanying drawings.

DETAILED DESCRIPTION

Figure 1A:
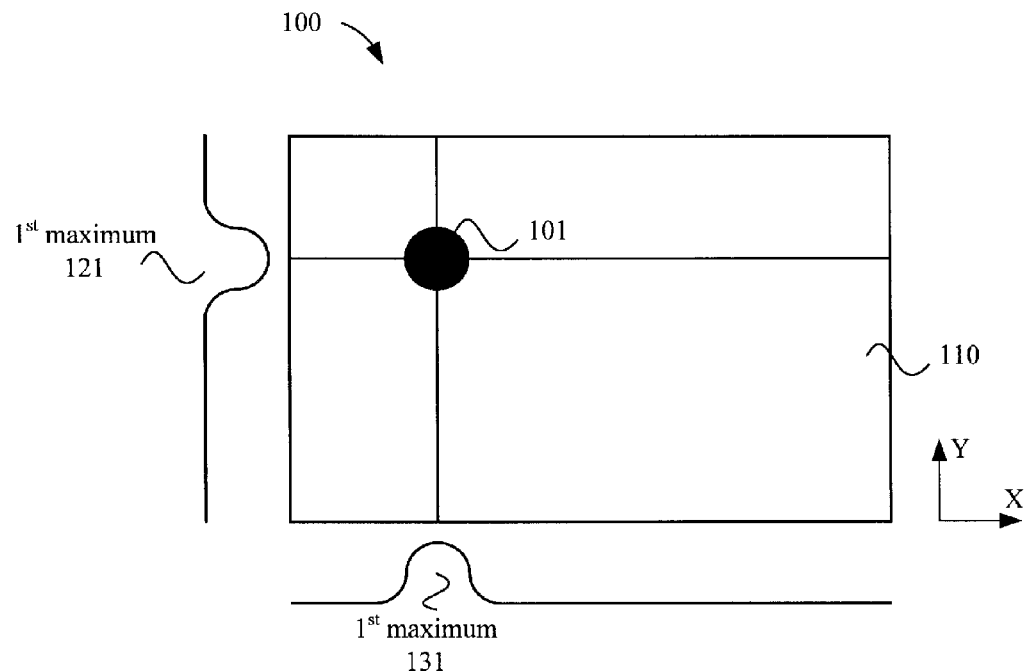
FIG. 1A illustrates a detection profile of a single touch with a first type of conventional touchpad.
Figure 1B:
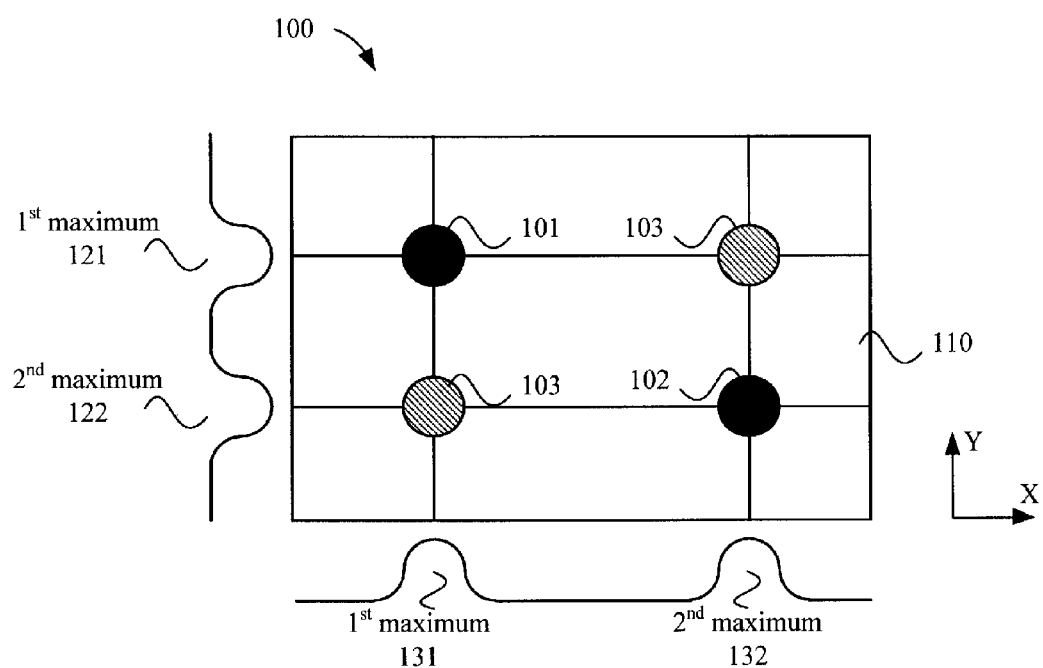
FIG. 1B illustrates the detection profile of FIG. 1A with a second touch on the first type of conventional touchpads.

Described herein is a multi-axial touch-sensor device with multi-touch resolution. The following description sets forth numerous specific details such as examples of specific systems, components, methods, and so forth, in order to provide a good understanding of several embodiments of the present invention. It will be apparent to one skilled in the art, however, that at least some embodiments of the present invention may be practiced without these specific details. In other instances, well-known components or methods are not described in detail or are presented in simple block diagram format in order to avoid unnecessarily obscuring the present invention. Thus, the specific details set forth are merely exemplary. Particular implementations may vary from these exemplary details and still be contemplated to be within the spirit and scope of the present invention.

Embodiments of a method and an apparatus are described to detect and resolve locations of two or more substantially simultaneous touches on a touch-sensor device, in addition to detecting and resolving single touches and substantially sequential touches on the touch-sensor device. In one embodiment, the method includes detecting presences of two or more substantially simultaneous touches on a touch-sensor device at respective locations on the touch-sensor device, and resolving locations of two or more substantially simultaneous touches on the touch-sensor device. In one embodiment, the apparatus includes a first set of sensor elements disposed in a first axis, a second set of sensor elements disposed in a second axis, and a third set of sensor elements disposed in a third axis. The apparatus may further include a processing device coupled to each of the first, second, and third sets of sensor elements to detect presences of two substantially simultaneous touches on the sensor elements, and to resolve the locations of the two substantially simultaneous touches on the touch-sensor device using the information received from the first, second, and third sets of sensor elements.

Multi-axial touch-sensor devices with multi-touch resolution, as described herein, include the capability to detect and resolve locations of two or more substantially simultaneous touches. In one embodiment, the touch sensor device is a touchpad. Alternatively, the touch sensor device may be a touch screen or other type of touch sensitive user interface device, such as a touch-sensor slider, or the like.

From a theoretical standpoint, one can determine that with two axes (e.g., X and Y) arranged approximately orthogonal to each other, it is possible to resolve the location of one touch. A reason that a second touch may not be able to be resolved is that there can be insufficient information as to which potential locations are actual touches, and which are projections of something not really there (also referred to herein as "ghost" touches or points). In other words, two axes may be capable of detecting the presence of multiple touches, but may introduce ghost locations that keep the device from resolving the locations of all the touches.

A solution to this problem may be based on normal linear algebraic rules for solving for variables. The general rule is that n equations are needed to solve for n unknowns. In this case of touchpads, the set of equations is not linear based, but on planar space where a second variable is needed to solve for even the first point. However, since all following points are known to reside in the same plane of the touchpad, one more variable is needed to resolve each additional point.

In the case of axial sensing, this translates into one additional axis for each additional point that needs to be resolved. Since all points are still in the same plane, instead of using an orthogonal coordinate system a touchpad that supports more than two axes within the same plane can be used.

The general equation for the number of points that may be resolved within a plane is:

$$\text{Points} = \text{Axes} - 1 \tag{1}$$

To get these additional axes within the same plane, the axes intersect at angles other than 90 degrees. The general equation for the nominal angle of intersection of the sensing axes in a touchpad having two or more axes is:

$$\text{Angle} = 180°/\text{Axes} \tag{2}$$

The following table lists some of the combinations that come from such a system of axes.

TABLE 1

| Points | Axes | Interior Angle |
|--------|------|----------------|
| 1 | 2 | 90° |
| 2 | 3 | 60° |
| 3 | 4 | 45° |
| 4 | 5 | 36° |
| 5 | 6 | 30° |
| 8 | 9 | 20° |

Note here that to sense and resolve two substantially simultaneous points or touches within a plane a minimum of three axes needs to be used. While in reality these axes can be at any reasonable angle to each other, optimal sensing occurs when they are at equal angles to each other.

The next step is to determine how to get three axes of sensing from a single plane. In one embodiment, a hexagon shape is used for the sensor elements to get three axes of sensing from a single plane. In another embodiment, a diamond shape is used for the sensor elements. It should be noted that a diamond shape and a hexagon shape may not necessarily be optimal for all implementations. In alternative embodiments, other lines (e.g., rows, columns, diagonal columns, or diagonal rows) of tessellated shapes or strips of electrically conductive material are used for the sensor elements.

In most cases, touch sensitive surfaces are engineered to limit their detection capability to that of the worst case condition; however, in special cases they can handle more. Note that when multiple touches do not create ghost touch locations, it is possible to detect and resolve the location of three or more substantially simultaneous touches with a tri-axial touch-sensor device. It may be possible to remove the invalid or ghost locations by defining those areas where ghost locations may occur to be invalid or by removing the sensing elements from that part of the sensing surface.

Conventional implementations were either designed for single touch (XY row/column) or fully addressable matrix supporting any number of touches. The multi-axial sensing scheme described herein may allow resolution of two or more touches without additional routing layers, and possibly increasing minimally the number of connections to the capacitance sensing device.

As noted, the addition of a third axis does increase the number of connections between the sensor array and a capacitive sensing controller, however, the number of connections can also be reduced if proper visualization is used within each of the axes to be scanned. For example, when first looking at the number of sensing elements to scan in the tri-axial hexagon array (illustrated in FIG. 3), it appears to take eleven signals to scan the first axis of sensor elements, ten signals for the second axis of sensor elements, and five signals to scan the third axis of sensor elements. However, if the end of each of the first and second axes of sensor elements (e.g., sensor elements disposed on diagonal axes) is wrapped back upon themselves (e.g., diagonals connected as virtual cylinders), it is possible to combine the partial rows (or columns), and thus, reduce the total number of sensing signals between the sensor array. For this example, the first axis of sensor elements could be reduced from eleven to eight signals (e.g., signals connected to pins of the processing device), and the second axis of sensor reduced from ten to eight signals.

Advantages of embodiments of the present invention may include one or more of the following: multi-axial scanning (e.g., three or more axes) which improves the spatial resolution of the detected location; the ability to resolve the location of two or more substantially simultaneous touches without the use of an APA array; the ability to route three axes on two layers; and tri-axial sensing layouts for low and high sheet-rho material. The term sheet-rho, as used herein, refers to the sheet resistance of a material and how strongly the material opposes the flow of electrical current. The sheet resistance of the material is measured in ohms per square. The higher the sheet-rho of the conductive materials used to make the capacitance sensing elements, the greater the resistance of these sensing elements once the material has been patterned to make the capacitive sensing elements. For example, in the sub-micron thicknesses normally used for touch screens, Indium Tin Oxide (ITO), which is a transparent ceramic conductor, has a nominal sheet-rho of from 100 to 1000 ohms/square, copper in the nominal plating ways used on circuit boards for touch pads has a sheet-rho of less than one ohms/square, and Poly(3,4-ethylenedioxythiophene) poly(styrenesulfonate) (PEDOT:PSS) has a nominal sheet-rho range of 0.5 to 30 kohms/square. It should be noted that sheet-rho, as a parameter, is related to the conductivity of the specific element or compound, and to its applied thickness, which results in a wide range of values for each of these materials.

Figure 2A:
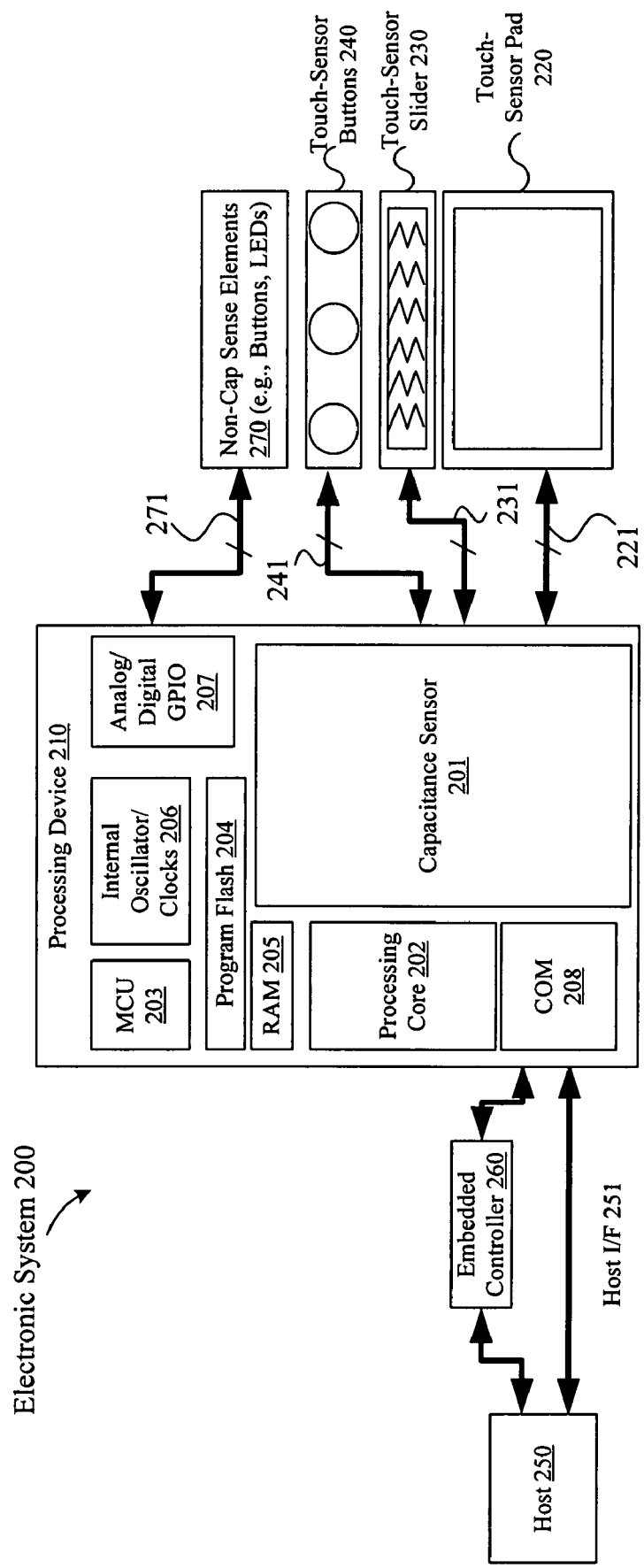
FIG. 2A illustrates a block diagram of one embodiment of an electronic system having a processing device for detecting a presence of a conductive object.

FIG. 2A illustrates a block diagram of one embodiment of an electronic system having a processing device for detecting a presence of a conductive object. Electronic system 200 includes processing device 210, touch-sensor pad 220, touch-sensor slider 230, touch-sensor buttons 240, host processor 250, embedded controller 260, and non-capacitance sensor elements 270. The processing device 210 may include analog and/or digital general purpose input/output ("GPIO") ports 207. GPIO ports 207 may be programmable. GPIO ports 207 may be coupled to a Programmable Interconnect and Logic ("PIL"), which acts as an interconnect between GPIO ports 207 and a digital block array of the processing device 210 (not illustrated). The digital block array may be configured to implement a variety of digital logic circuits (e.g., DAC, digital filters, digital control systems) using, in one embodiment, configurable user modules ("UMs"). The digital block array may be coupled to a system bus (not illustrated). Processing device 210 may also, include memory, such as random access memory (RAM) 205 and program flash 204. RAM 205 may be static RAM (SRAM) or the like, and program flash 204 may be a non-volatile storage, or the like, which may be used to store firmware (e.g., control algorithms executable by processing core 202 to implement operations described herein). Processing device 210 may also include a memory controller unit (MCU) 203 coupled to memory and the processing core 202.

As illustrated, capacitance sensor 201 may be integrated into processing device 210. Capacitance sensor 201 may include analog I/O for coupling to an external component, such as touch-sensor pad 220, touch-sensor slider 230, touch-sensor buttons 240, and/or other devices. Capacitance sensor 201 and processing device 210 are described in more detail below.

It should be noted that the embodiments described herein are not limited to touch-sensor pads for notebook implementations, but can be used in other capacitive sensing implementations, for example, the sensing device may be a touch screen, a touch-sensor slider 230, or a touch-sensor button 240 (e.g., capacitance sensing button). It should also be noted that the embodiments described herein may be implemented in other sensing technologies than capacitive sensing, such as resistive, optical imaging, surface acoustical wave (SAW), infrared, dispersive signal, and strain gauge technologies. Similarly, the operations described herein are not limited to notebook pointer operations, but can include other operations, such as lighting control (dimmer), temperature or environmental control, volume control, graphic equalizer control, speed control, or other control operations requiring gradual or discrete adjustments. It should also be noted that these embodiments of capacitive sensing implementations may be used in conjunction, with non-capacitive sensing elements, including but not limited to pick buttons, sliders (ex. display brightness and contrast), scroll-wheels, multi-media control (ex. volume, track advance, etc.) handwriting recognition and numeric keypad operation.

In one embodiment, the electronic system 200 includes a touch-sensor pad 220 coupled to the processing device 210 via bus 221. Touch-sensor pad 220 may include a multi-axial sensor array, such as a tri-axial or a quad-axial sensor array. In another embodiment, touch sensor pad 220 may be a transparent touch screen. In another embodiment, the electronic system 200 includes a touch-sensor slider 230 coupled to the processing device 210 via bus 231. Touch-sensor slider 230 may include a multi-axial sensor array, such as a tri-axial or a quad-axial sensor array. In one embodiment, the sensor elements of the tri- and quad-axial sensor arrays are capacitance sensor elements. Capacitance sensor elements may be used as non-contact sensors. These sensor elements, when protected by an insulating layer, offer resistance to severe environments.

The electronic system 200 may include any combination of one or more of the touch-sensor pad 220, touch-sensor slider 230, and/or touch-sensor button 240. In another embodiment, the electronic system 200 also includes non-capacitance sensor elements 270 coupled to the processing device 210 via bus 271. The non-capacitance sensor elements 270 may include buttons, light emitting diodes (LEDs), and other user interface devices, such as a mouse, a keyboard, a display, or other functional keys that do not use capacitance sensing. In one embodiment, buses 271, 241, 231, and 221 are a single bus. Alternatively, these buses may be configured into any combination of one or more separate buses.

The processing device 210 may also provide value-added functionality such as keyboard control integration, LEDs, battery charger, and general purpose I/O, as illustrated as non-capacitance sensor elements 270. Non-capacitance sensor elements 270 are coupled to the GPIO 207.

Processing device 210 may include internal oscillator/clocks 206 and communication block 208. The oscillator/clocks block 206 provides clock signals to one or more of the components of processing device 210. Communication block 208 may be used to communicate with an external component, such as a host processor 250, via host interface (I/F) 251.

Alternatively, processing block 210 may also be coupled to embedded controller 260 to communicate with the external components, such as host 250. Interfacing to the host 250 can be through various methods. In one exemplary embodiment, interfacing with the host 250 is done using a standard PS/2 interface to connect to an embedded controller 260, which in turn sends data to the host 250 via a low pin count (LPC) interface. In some instances, it may be beneficial for the processing device 210 to do both touch-sensor pad and keyboard control operations, thereby freeing up the embedded controller 260 for other housekeeping functions. In another exemplary embodiment, interfacing is done using a universal serial bus (USB) interface directly coupled to the host 250 via host interface 251. Alternatively, the processing device 210 may communicate to external components, such as the host 250 using industry standard interfaces, such as USB, PS/2, inter-integrated circuit (12C) bus, or system packet interfaces (SPI). The host 250 and/or embedded controller 260 may be coupled to the processing device 210 with a ribbon or flex cable from an assembly, which houses the sensing device and processing device.

In one embodiment, the processing device 210 is configured to communicate with the embedded controller 260 or the host 250 to send and/or receive data. The data may be a command or alternatively a signal. In an exemplary embodiment, the electronic system 200 operates in both standard-mouse compatible and enhanced modes. The standard-mouse compatible mode utilizes the HID class drivers already built into the Operating System (OS) software of host 250. These drivers enable the processing device 210 and sensing device to operate as a standard pointer control user interface device, such as a two-button PS/2 mouse. The enhanced mode may enable additional features such as scrolling or disabling the sensing device, such as when a mouse is plugged into the notebook. Alternatively, the processing device 210 may be configured to communicate with the embedded controller 260 or the host 250, using non-OS drivers, such as dedicated touch-sensor pad drivers, or other drivers known by those of ordinary skill in the art.

In one embodiment, the processing device 210 is configured to communicate data (e.g., commands or signals) using hardware, software, and/or firmware, and the data may be communicated directly to the processing device of the host 250, such as a host processor, or alternatively, may be communicated to the host 250 via drivers of the host 250, such as OS drivers, or other non-OS drivers. It should also be noted that the host 250 may directly communicate with the processing device 210 via host interface 251.

In one embodiment, the data sent to the host 250 from the processing device 210 includes click, double-click, movement of the pointer, scroll-up, scroll-down, scroll-left, scroll-right, step Back, and step Forward. In another embodiment, the data sent to the host 250 include the position or location of the one or more conductive objects on the sensing device. Alternatively; other user interface device commands may be communicated to the host 250 from the processing device 210. These commands may be based on gestures occurring on the sensing device that are recognized by the processing device, such as tap, push, hop, drag, and zigzag gestures. Alternatively, other commands may be recognized. Similarly, signals may be sent that indicate the recognition of these operations.

Processing device 210 may reside on a common carrier substrate such as, for example, an integrated circuit (IC) die substrate, a multi-chip module substrate, or the like. Alternatively, the components of processing device 210 may be one or more separate integrated circuits and/or discrete components. In one exemplary embodiment, processing device 210 is a Programmable System on a Chip (PSoC®) device, manufactured by Cypress Semiconductor Corporation, San Jose, Calif. Alternatively, processing device 210 may be one or more other processing devices known by those of ordinary skill in the art, such as a microprocessor or central processing unit, a controller, special-purpose processor, digital signal processor (DSP), an application specific integrated circuit (ASIC), a field programmable gate array (FPGA), or the like. In an alternative embodiment, for example, the processing device is a network processor having multiple processors including a core unit and multiple microengines. Additionally, the processing device may include any combination of general-purpose processing device(s) and special-purpose processing device(s).

It should also be noted that the embodiments described herein are not limited to having a configuration of a processing device coupled to a host, but may include a system that measures the capacitance on the sensing device and sends the raw data to a host computer where it is analyzed by an application. In effect the processing that is done by processing device 210 may, also be done in the host. In another embodiment, the processing device 210 is the host.

Embodiments of the method and apparatus described herein may be implemented in a fully self-contained touch-sensor pad, which outputs fully processed X/Y movement and gesture data signals or data commands to a host. The method and apparatus may also be implemented in a touch-sensor pad, which outputs X/Y movement data and also finger presence data to a host, and where the host processes the received data to detect gestures. The method and apparatus may also be implemented in a touch-sensor pad, which outputs raw capacitance data to a host, where the host processes the capacitance data to compensate for quiescent and stray capacitance, and calculates X/Y movement and detects gestures by processing the capacitance data. Alternatively, the method and apparatus may be implemented in a touch-sensor pad, which outputs pre-processed capacitance data to a host, where the touchpad processes the capacitance data to compensate for quiescent and stray capacitance, and the host calculates X/Y movement and detects gestures from the pre-processed capacitance data.

The electronic system that includes the embodiments described herein may be implemented in a touch-sensor pad of a conventional laptop (e.g., notebook computer). Alternatively, it may be implemented in a wired or wireless keyboard integrating a touch-sensor pad, which is itself connected to a host. Alternatively, it may be implemented as a transparent touch screen. Alternatively, the embodiments may be implemented in a mobile handset (e.g., cellular or mobile phone) or other electronic devices where the touch-sensor pad may operate in one of two or more modes. For example, the touch-sensor pad may operate either as a touch-sensor pad for x/y positioning and gesture recognition, or as a keypad or other arrays of touch-sensor buttons and/or sliders. Alternatively, the touch-sensor pad, although configured to operate in the two modes; may be configured to be used only as a keypad, or only as a touch-sensor pad. Alternatively, the electronic device may be used in other applications, such as a personal data assistant (PDA), a kiosk, a keyboard, a television, a remote control, a monitor, a handheld multi-media device, a handheld video player, a handheld gaming device, or a control panel.

Capacitance sensor 201 may be integrated into the processing device 210, or alternatively, in a separate IC. Alternatively, descriptions of capacitance sensor 201 may be generated and compiled for incorporation into other integrated circuits. For example, behavioral level code describing capacitance sensor 201, or portions thereof, may be generated using a hardware description language, such as VHDL or Verilog, and stored to a machine-accessible medium (e.g., Flash ROM, CD-ROM, hard disk, floppy disk, or the like). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 201.

It should be noted that the components of electronic system 200 may include all the components described above. Alternatively, electronic system 200 may include only some of the components described above, or include additional components not listed herein.

In one embodiment, capacitance sensor 201 is a capacitive sense relaxation oscillator (CSR). The CSR may include a current-programmable relaxation oscillator, an analog multiplexer, digital counting functions, and high-level software routines to compensate for environmental and physical sensor element variations.

It should be noted that there are various known methods for measuring capacitance. Although some embodiments described herein are described using a relaxation oscillator, the present embodiments are not limited to using relaxation oscillators, but may include other methods, such as current versus voltage phase shift measurement, resistor-capacitor charge timing, capacitive bridge divider, charge transfer, sigma-delta modulators, charge-accumulation circuits, or the like.

The current versus voltage phase shift measurement may include driving the capacitance through a fixed-value resistor to yield voltage and current waveforms that are out of phase by a predictable amount. The drive frequency can be adjusted to keep the phase measurement in a readily measured range. The resistor-capacitor charge timing may include charging the capacitor through a fixed resistor and measuring timing on the voltage ramp. Small capacitance values may require very large resistors for reasonable timing. The capacitive bridge divider may include driving the capacitor under test through a fixed reference capacitor. The reference capacitor and the capacitor under test form a voltage divider. The voltage signal may be recovered with a synchronous demodulator, which may be done in the processing device 210. The charge transfer may be conceptually similar to an R-C charging circuit. In this method, $C_p$ is the capacitance being sensed. $C_{SUM}$ is the summing capacitor, into which charge is transferred on successive cycles. At the start of the measurement cycle, the voltage on $C_{SUM}$ is discharged. The voltage on $C_{SUM}$ increases exponentially (and only slightly) with each clock cycle. The time for this voltage to reach a specific threshold is measured with a counter. Additional details regarding these alternative embodiments have not been included so as to not obscure the present embodiments, and because these alternative embodiments for measuring capacitance are known by those of ordinary skill in the art.

Figure 2B:
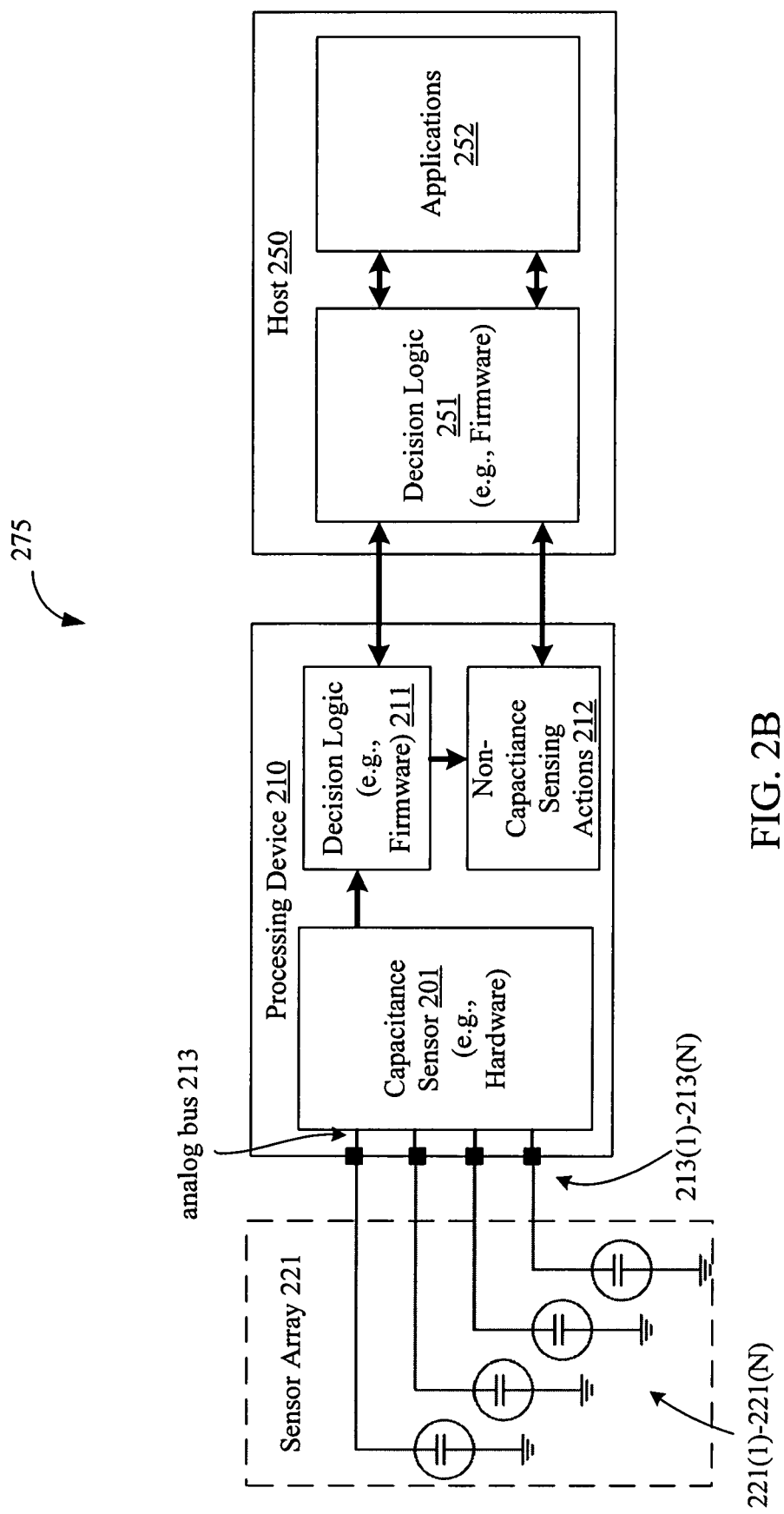
FIG. 2B illustrates a block diagram of one embodiment of an electronic device including a processing device that includes a capacitance sensor for measuring the capacitance on a sensor array. A

FIG. 2B illustrates a block diagram of one embodiment of an electronic device 275 including the processing device 210 that includes the capacitance sensor 201 for measuring the capacitance on the sensor array 221. The electronic device 275 of FIG. 2B includes a sensor array 221, processing device 210, and host 250. Sensor array 221 includes sensor elements 221(1)-221(N), where N is a positive integer value that represents the total number of sensor elements of the sensor array 221. Each sensor element is represented as a capacitor. The sensor array 221 is coupled to processing device 210 via an analog bus 213 having multiple pins 213(1)-213(N).

In one embodiment, the capacitance sensor 201 includes a selection circuit (not illustrated). The selection circuit is coupled to the sensor elements 221(1)-221(N) and the sensing circuitry of the capacitance sensor 201. Selection circuit may be used to allow the capacitance sensor to measure capacitance on multiple sensor elements of an axis (e.g., row, column, or other non-orthogonal axis). The selection circuit may be configured to sequentially select the sensor elements of each axis to provide the charge current and to measure the capacitance of each sensor element. In an alternate embodiment, the selection circuit may be configured to select a plurality of sensor elements of each axis to provide the charge current and to measure the capacitance of each sensor element. In one exemplary embodiment, the selection circuit is a multiplexer array. Alternatively, the selection circuit may be other circuitry inside or outside the capacitance sensor 201 to select the sensor element to be measured. In another embodiment, one capacitance sensor 201 is used to measure capacitance on all of the sensor elements of the sensor array. Alternatively, multiple capacitance sensors 201 may be used to measure capacitance on the sensor elements of the sensor array. The multiplexer array may also be used to connect the sensor elements that are not being measured to the system ground. This may be done in conjunction with a dedicated a pin in the GP10 port 207.

In another embodiment, the capacitance sensor 201 is configured to simultaneously sense the set of sensor elements, as opposed to being configured to sequentially scan the set of sensor elements as described above. For example, the sensing device may include a sensor array having multiple axes of sensor elements in rows, columns, or other non-orthogonal directions. Each axis may be sensed simultaneously or independent of the others.

In one embodiment, the processing device 210 further includes a decision logic block 211. The operations of decision logic block 211 may be implemented in firmware; alternatively, it may be implemented in hardware or software. The decision logic block 211 may be configured to receive the digital code or counts from the capacitance sensor 201, and to determine the state of the sensor array 221, such as whether a conductive object is detected on the sensor array, where the conductive object was detected on the sensor array (e.g., determining the X-, Y-coordinates of the presence of the conductive object), determining absolute or relative position of the conductive object, whether the conductive object is performing a pointer operation, whether a gesture has been recognized on the sensor array 221 (e.g., click, double-click, movement of the pointer, scroll-up, scroll-down, scroll-left, scroll-right, step Back, step Forward, tap, push, hop, zigzag gestures, or the like), or the like.

In another embodiment, instead of performing the operations of the decision logic 211 in the processing device 210, the processing device 201 sends the raw data to the host 250, as described above. Host 250, as illustrated in FIG. 2B, may include the decision logic 251. The operations of the decision logic 251 may also be implemented in firmware, hardware, and/or software. Also, as described above the host may include high-level APIs in applications 252 that perform routines on the received data, such as compensating for sensitivity differences, other compensation algorithms, baseline update routines, start-up and/or initialization routines, interpolations operations, scaling operations, or the like. The operations described with respect to the decision logic 211 may be implemented in decision logic 251, applications 252, or in other hardware, software, and/or firmware external to the processing device 210.

In another embodiment, the processing device 210 also includes a non-capacitance sensing actions block 212. This block may be used to process and/or receive/transmit data to and from the host 250. For example, additional components may be implemented to operate with the processing device 210 along with the sensor array 221 (e.g., keyboard, keypad, mouse, trackball, LEDs, displays, or the like).

The sensor array may be a grid-like pattern of sensor elements (e.g., capacitive elements) used in conjunction with the processing device 210 to detect a presence and position of a conductive object, such as a finger, to a resolution greater than that which is native. The touch-sensor pad layout pattern may be disposed to maximize the area covered by conductive material, such as copper, ITO, or PEDOT:PSS, in relation to spaces necessary to define the rows, columns, or other axes of the sensor array.

Figure 3:
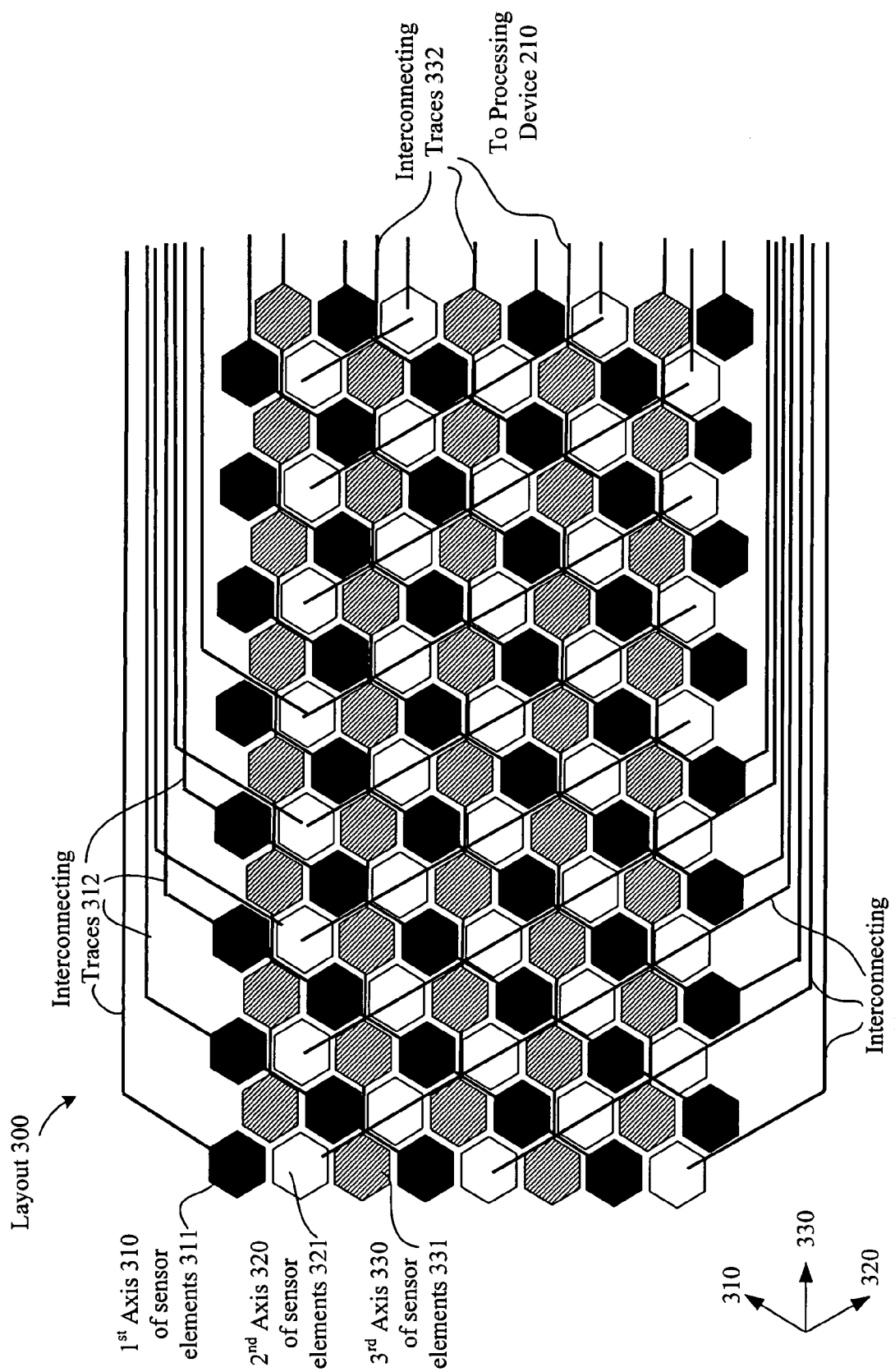
FIG. 3 illustrates one embodiment of a layout for hexagon-based tri-axial sensing.
Figure 4A:
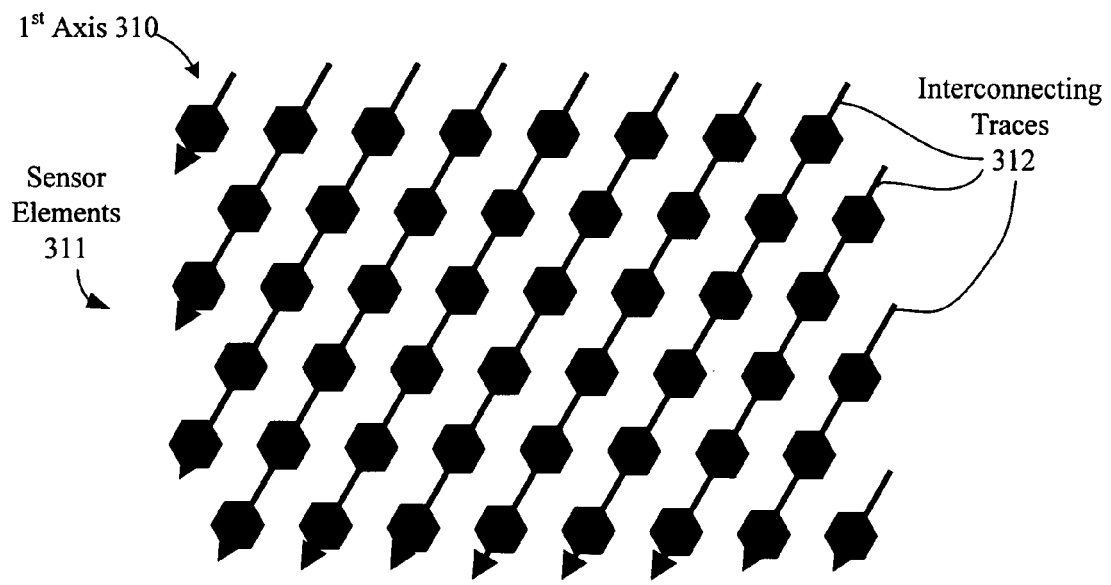
FIG. 4A illustrates a first sensing axis for the hexagon-based tri-axial sensing layout of FIG. 3.
Figure 4B:
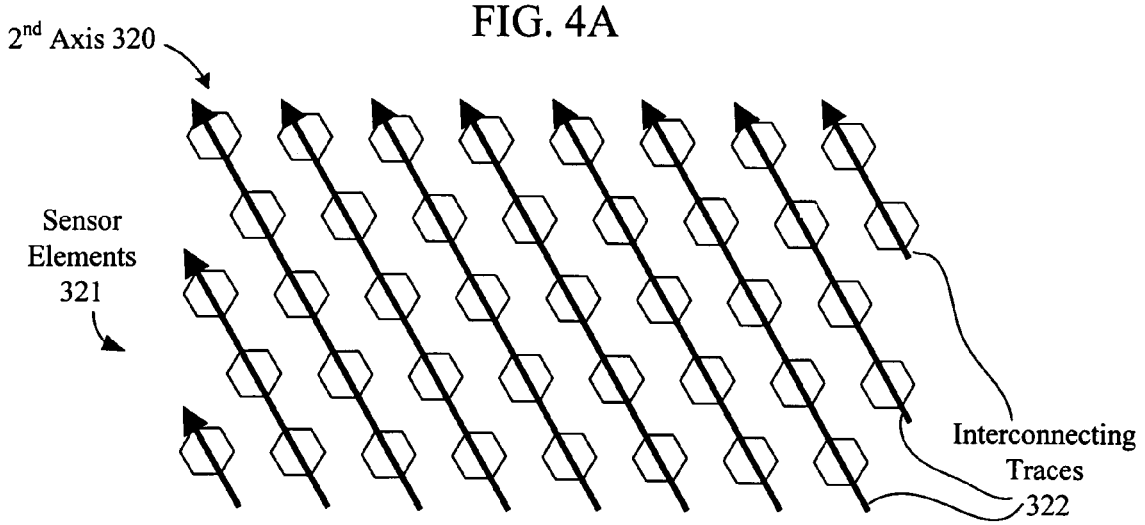
FIG. 4B illustrates a second sensing axis for the hexagon-based tri-axial sensing layout of FIG. 3.
Figure 4C:
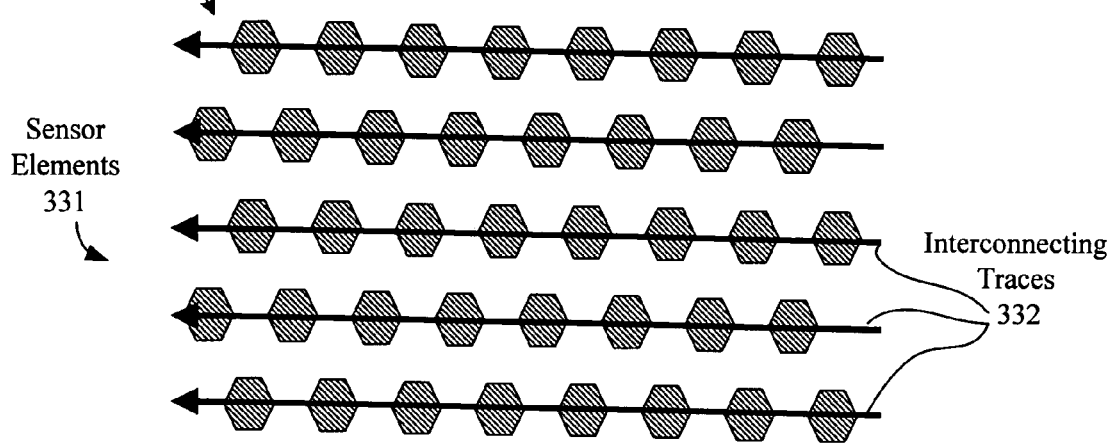
FIG. 4C illustrates a third sensing axis for the hexagon-based tri-axial sensing layout of FIG. 3.

FIG. 3 illustrates one embodiment of a layout 300 for hexagon-based tri-axial sensing. Layout 300 includes three independent sensing axes, namely first axis 310, second axis 320, and third axis 330. Each axis of sensor elements is illustrated independent of the others in FIGS. 4A, 4B, and 4C, respectively. The first axis 310 includes multiple sensors 311 disposed along the first axis 310, illustrated as black hexagons. The first axis 310 is disposed on a diagonal with respect to the horizontal and vertical axes (e.g., approximately 60° from the horizontal axis). Diagonal columns of the sensor elements 311 are coupled to interconnecting traces 312, which are coupled to the processing device 210. Since the sensor elements 311 are disposed diagonally within a rectangular shape, some of the diagonal columns of sensor elements 311 are partial columns; for example, each complete diagonal column of the first axis 310 includes six sensor elements, and the partial columns include one sensor element, three sensor elements, or five sensor elements. Alternatively, other numbers of sensor elements can be used in the complete and partial diagonal columns of the first axis 310.

The second axis 320 includes multiple sensors 321 disposed along the second axis 320, illustrated as white hexagons. The second axis 320 is disposed on a diagonal with respect to the horizontal and vertical axis (e.g., approximately 60° from the horizontal axis). Diagonal columns of the sensor elements 321 are coupled to interconnecting traces 322, which are coupled to the processing device 210. Since the sensor elements 321 are also disposed diagonally within the rectangular shape, some of the diagonal columns of sensor elements 321 are partial columns; for example, each complete diagonal column of the second axis 320 includes six sensor elements, and the partial columns include one sensor element, three sensor elements, or five sensor elements. Alternatively, other numbers of sensor elements can be used in the complete and partial diagonal columns of the second axis.

The third axis 330 includes multiple sensors 331 disposed along the third axis 330, illustrated as hashed hexagons. The third axis 330 is disposed on a horizontal axis. Rows of the sensor elements 331 are coupled to interconnecting traces 332, which are coupled to the processing device 210. Since the sensor elements 331 are disposed in rows within the rectangular shape, all of the rows are complete rows; for example, each complete row includes eight sensor elements. Alternatively, other numbers of sensor elements can be used in the complete rows of the third axis 330.

It should be noted that although the layout 300 includes three axes, one disposed on a horizontal axis and two diagonal axes, other configurations are possible, such as three diagonal axes, or one vertical axis and two diagonal axes (illustrated in FIGS. 5 and 6A-6C). As described above, since there are three axes, the nominal angle of intersection is approximately 60°; however, other angles of intersection may be used. Also, as described above, since the layout 300 includes three axes, the processing device 210 is configured to detect multiple (e.g., two or more) substantially simultaneous touches and resolve at least two touches within the plane of the touch-sensor device.

The sensor elements 311, 321, and 331 of FIG. 3 have a hexagonal shape. The hexagon shape, which has the highest ratio of surface area to perimeter for a regular tessellating polygon, is commonly used in copper or other low sheet-rho based surfaces for capacitive sensing. This ratio plays into the signal-to-noise (SNR) ratio of the overall capacitive sensing system. The higher the ratio, the lower the parasitic capacitance. However, as can be seen in FIGS. 3, and 4A-4C, when implemented with hexagons there is significant trace length of the interconnecting traces 312, 322, and 332 between each of the sensor elements 311, 321, and 331. In a low-sheet-rho media, for example, copper, carbon, silver ink, or the like, these interconnecting traces do not have a significant impact on how sensing is performed.

Figure 5:
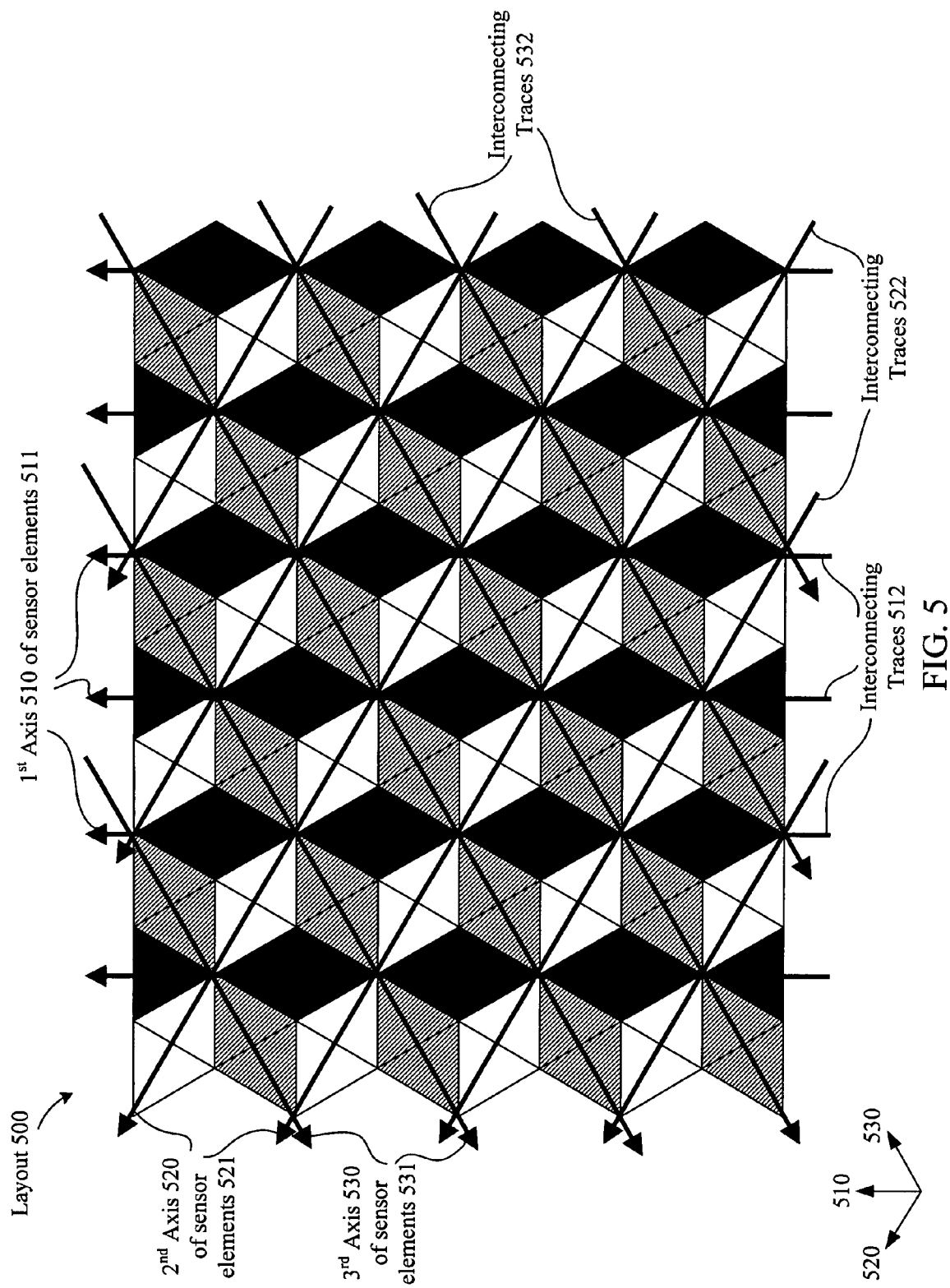
FIG. 5 illustrates one embodiment of a layout for diamond-based tri-axial sensing.
Figure 6A:
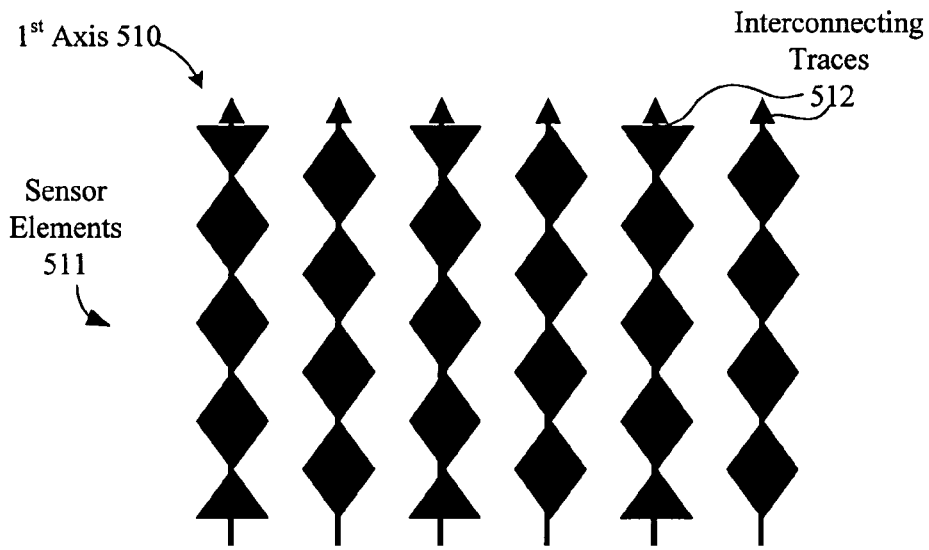
FIG. 6A illustrates a first sensing axis for the diamond-based tri-axial sensing layout of FIG. 5.
Figure 6B:
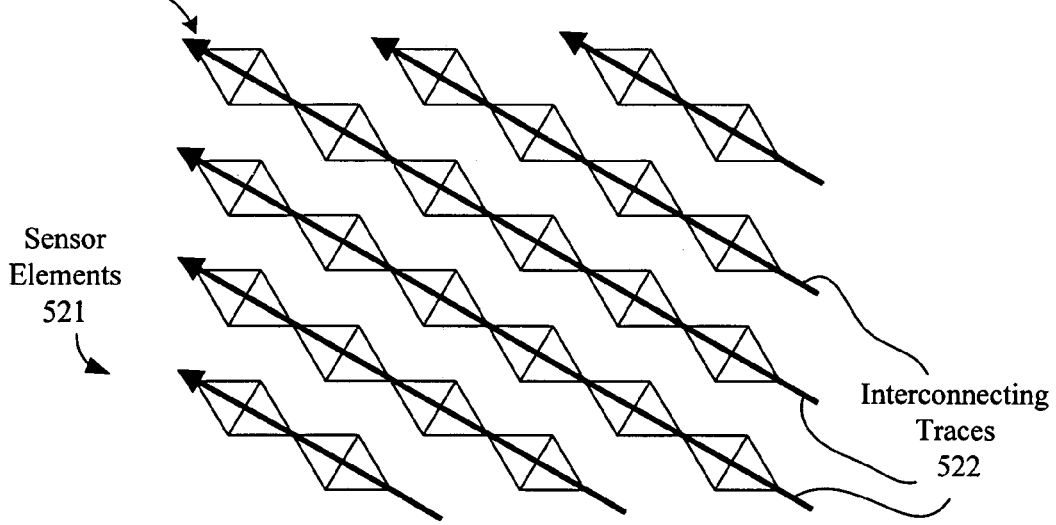
FIG. 6B illustrates a second sensing axis for the diamond-based tri-axial sensing layout of FIG. 5.
Figure 6C:
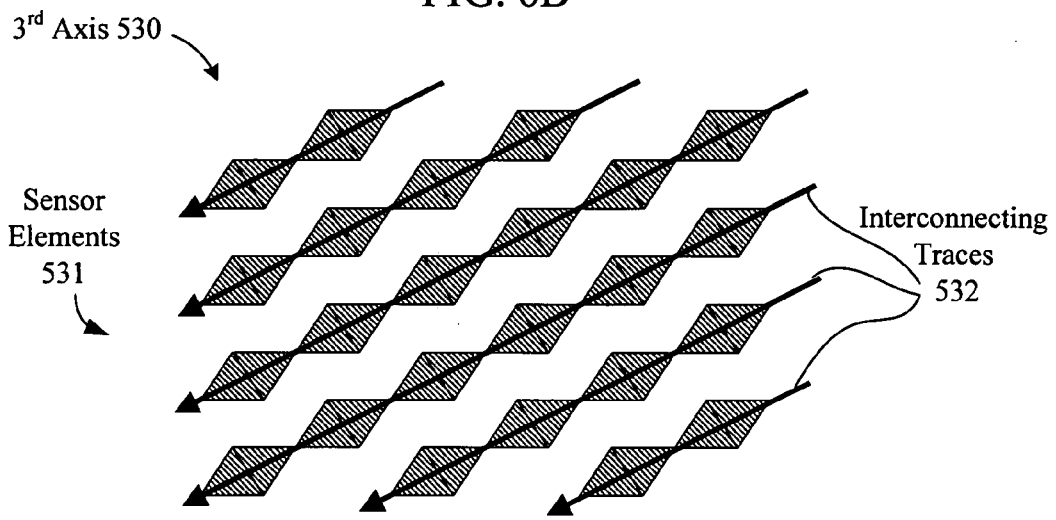
FIG. 6C illustrates a third sensing axis for the diamond-based tri-axial sensing layout of FIG. 5.

In high-sheet-rho material, for example, Indium Tin Oxide (ITO), PEDOT:PSS, or the like, these interconnecting traces contribute significant resistance to the sensing of each row, column, or diagonal of coupled sensor elements, such that the scanning rate may need to be slowed considerable to allow any external coupled capacitance to be sensed. To deal with this, an alternate pattern based on a diamond shape may be used, such as illustrated in FIG. 5. The diamond shape allows connection between elements to occur at or near the vertices of the sensor elements, thus limiting the resistance impact to sensing of the entire row or column.

FIG. 5 illustrates one embodiment of a layout 500 for diamond-based tri-axial sensing. Layout 500 includes three independent sensing axes, namely first axis 510, second axis 520, and third axis 530. Each axis of sensor elements is illustrated independent of the others in FIGS. 6A, 6B, and 6C, respectively. The first axis 510 includes multiple sensors 511 disposed along the first axis 510, illustrated as black diamonds (e.g., full or partial diamonds). The first axis 510 is disposed on a vertical axis. Columns of the sensor elements 511 are coupled to interconnecting traces 512, which are coupled to the processing device 210. Since the sensor elements 511 are disposed in columns within a rectangular shape, all of the columns are complete columns; for example, each complete column includes four sensor elements (e.g., half of the columns have a half-diamond sensor element on top and one half-diamond sensor element on bottom). Alternatively, other numbers of sensor elements can be used in the complete columns of the first axis 510.

The second axis 520 includes multiple sensors 521 disposed along the second axis 520, illustrated as white diamonds. The second axis 520 is disposed on a diagonal with respect to the vertical axis (e.g., approximately 60° from the vertical axis). Diagonal columns of the sensor elements 521 are coupled to interconnecting traces 522, which are coupled to the processing device 210. It should be noted that although the sensor elements 521 of the second axis 520 have been referred to as diagonal columns, these sensor elements 521 of the second axis 520 could be considered diagonal rows. Since the sensor elements are also disposed diagonally within the rectangular shape, some of the diagonal columns of sensor elements 521 are partial columns; for example, each complete diagonal column of the second axis 520 includes six sensor elements 521, and the partial columns include four sensor elements or two sensor elements. Alternatively, other numbers of sensor elements can be used in the complete and partial diagonal columns of the second axis 520.

The third axis 530 includes multiple sensors 531 disposed along the third axis 530, illustrated as hashed diamonds. The third axis 530 is disposed on a diagonal with respect to the vertical axis (e.g., approximately 60° from the vertical axis). Diagonal columns (or diagonal rows) of the sensor elements 531 are coupled to interconnecting traces 532, which are coupled to the processing device 210. Since the sensor elements 531 are also disposed diagonally within the rectangular shape, some of the diagonal columns of sensor elements 531 are partial columns; for example, each complete diagonal column of the third axis 530 includes six sensor elements, and the partial columns include four sensor elements or two sensor elements. Alternatively, other numbers of sensor elements can be used in the complete and partial diagonal columns of the third axis 530.

It should be noted that although the layout 500 includes three axes, one disposed on a vertical axis and two diagonal axes, other configurations are possible, such as three diagonal axes, or one horizontal axis and two diagonal axes (illustrated in FIGS. 3 and 4A-4C). As described above, since there are three axes, the nominal angle of intersection is approximately 60°; however, other angles of intersection may be used. Also, as described above, since the layout 500 includes three axes, the processing device 210 is configured to detect multiple (e.g., two or more) substantially simultaneous touches and resolve at least two touches within the plane of the touch-sensor device.

It should be noted that, when using these diamond sensor elements, the interconnecting traces between adjacent sensor elements within the same row or column may be shorter than the interconnecting traces between the hexagonal-shaped sensor elements of FIG. 3. This may make the diamond shape appropriate for use on high sheet-rho material, such as ITO, which is often used on transparent touch screens.

As noted, the addition of a third axis does increase the number of connections between the sensor array and a capacitive sensing controller (e.g., processing device 210), however, the number of connections can also be reduced if proper visualization is used within each of the axis to be scanned. In one embodiment, the number of interconnecting traces that are coupled to the processing device 210 is equal to the number of complete and partial columns or rows for each of the axes. For example, when first looking at the number of sensor elements to scan the tri-axial hexagon array shown in FIG. 3, it appears to take eleven signals to scan the first axis 310 of sensor elements 311, ten signals for the second axis 320 of sensor elements 321, and five signals to scan the third axis 330 of sensor elements 331. In another embodiment, the end of each of the first and second axes 310 and 320 of sensor elements (e.g., sensor elements 311 and 321 disposed on diagonal axes) is wrapped back upon themselves (e.g., diagonals connected as virtual cylinders), it is possible to combine the partial diagonals to have the same number of sensor elements as the complete rows, and thus, reduce the total number of sensing signals and the number of interconnecting traces that are coupled to the processing device. For this example, the first axis 310 of sensor elements could be reduced from eleven to eight signals, and the second axis 320 of sensor reduced from ten to eight signals by coupling the partial columns of one sensor element to the partial column of five sensor elements, and by coupling the partial columns of three sensor elements of one side with the partial columns of three sensor elements of the other side. Similarly, the interconnecting traces 512, 522, and 532 of FIG. 5 can be reduced by coupling partial columns (or rows) together, such as the partial columns of four sensor elements of one side with the partial columns of two sensor elements of the other side.

Since touchpads (or touch screens) are common in consumer-level hardware, their implementation is generally quite cost sensitive. In one embodiment, an XY row/column touchpad may be implemented on as few as two routing layers; generally a top surface where all the sensor elements are located, and a lower surface where the sensing elements in either the rows or columns are joined together. With the tri-axial sensor elements described herein, it is also possible to route them on the same two layers that are used for a dual axis XY touchpad.

Figure 7:
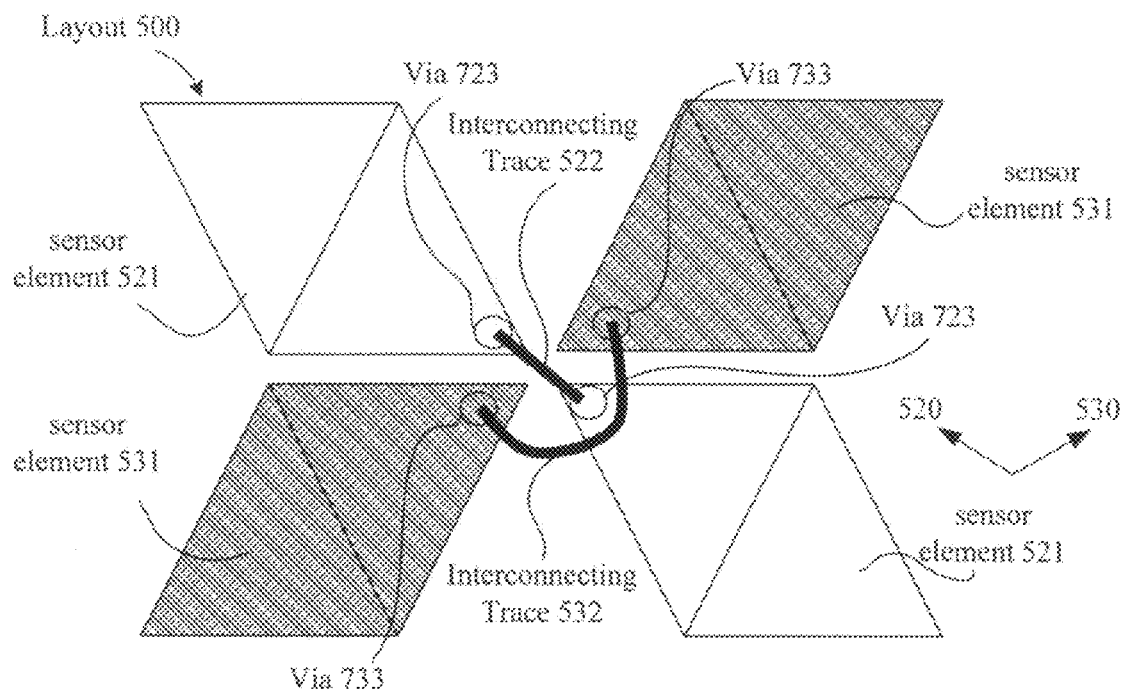
FIG. 7 illustrates a bottom-side view of one embodiment of interconnecting traces for two of the three axes of the diamond-based, tri-axial sensing layout of FIG. 5.

FIG. 7 illustrates a bottom-side view of one embodiment of interconnecting traces 522 and 532 for two of the three axes of the diamond-based, tri-axial sensing layout of FIG. 5. The second and third axes 520 and 530 of sensor elements 521 and 531 are on the top side of the circuit board and are connected on the bottom side (or other embedded plane) by the interconnecting traces 522 and 532 through vias 723 and 733, respectively. Similar connections would occur at each vertex area in the touchpad. In this embodiment, bottom surface interconnecting traces are not needed for the remaining axis, axis 510, since it is routed on the top surface of the circuit board using the interconnecting traces 512. Alternatively, all interconnecting traces may be coupled on the bottom surface of the circuit board. In another embodiment, interconnecting traces of one of the other two axes 520 and 530 are disposed, on the top surface of the circuit board and the interconnecting traces of the other of the two axes 520 and 530, and the first axis 510 are disposed on the bottom surface using vias to connect to the respective sensor elements. For sensing materials and substrates that do not normally support the implementation of vias, for example, when made using plastic or glass substrates with ITO sensing elements, these three sensing axes may be implemented on three or more separate sensing layers. Alternatively, other multi-layer configurations are possible.

Figure 8:
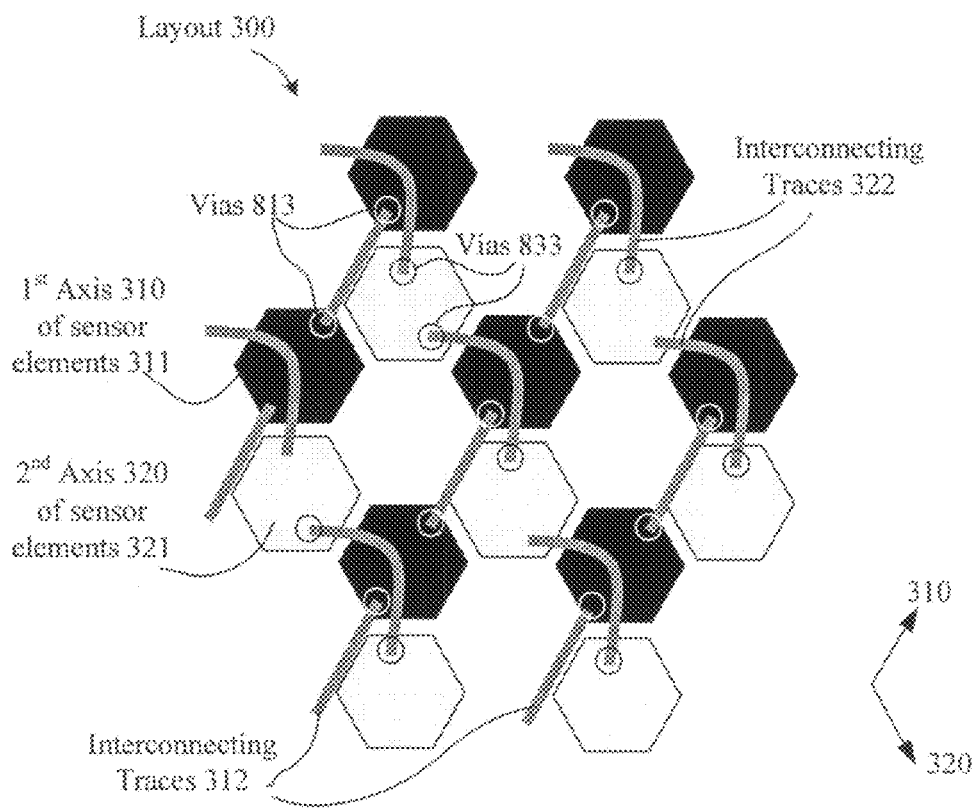
FIG. 8 illustrates a bottom-side view of one embodiment of interconnecting traces for two of the three axes of the hexagon-based, tri-axial sensing layout of FIG. 3.

FIG. 8 illustrates a bottom-side view of one embodiment of interconnecting traces 312 and 322 for two of the three axes of the hexagon-based, tri-axial sensing layout of FIG. 3. The first and second axes 310 and 320 of sensor elements 311 and 321 are on the top side of the circuit board and are connected on the bottom side (or other embedded plane) by the interconnecting traces 312 and 322 through vias 813 and 823, respectively. Similar connections would occur at each vertex area in the touchpad. In this embodiment, bottom surface interconnecting traces are not needed for the remaining axis, axis 330, since it is routed on the top surface of the circuit board using interconnecting traces 332. Alternatively, all interconnecting traces may be coupled on the bottom surface of the circuit board. In another embodiment, interconnecting traces of one of the other two axes 310 and 320 are disposed on the top surface of the circuit board, and the interconnecting traces of the other of the two axes 310 and 320 and the third axis 330 are disposed on the bottom surface using vias to connect to the respective sensor elements. Also, as described above, for sensing materials and substrates that do not normally support the implementation of vias, for example, when made using plastic or glass substrates with ITO sensing elements, these three sensing axes may be implemented on three or more separate sensing layers. Alternatively, other,multi-layer board configurations are possible.

Figure 9:
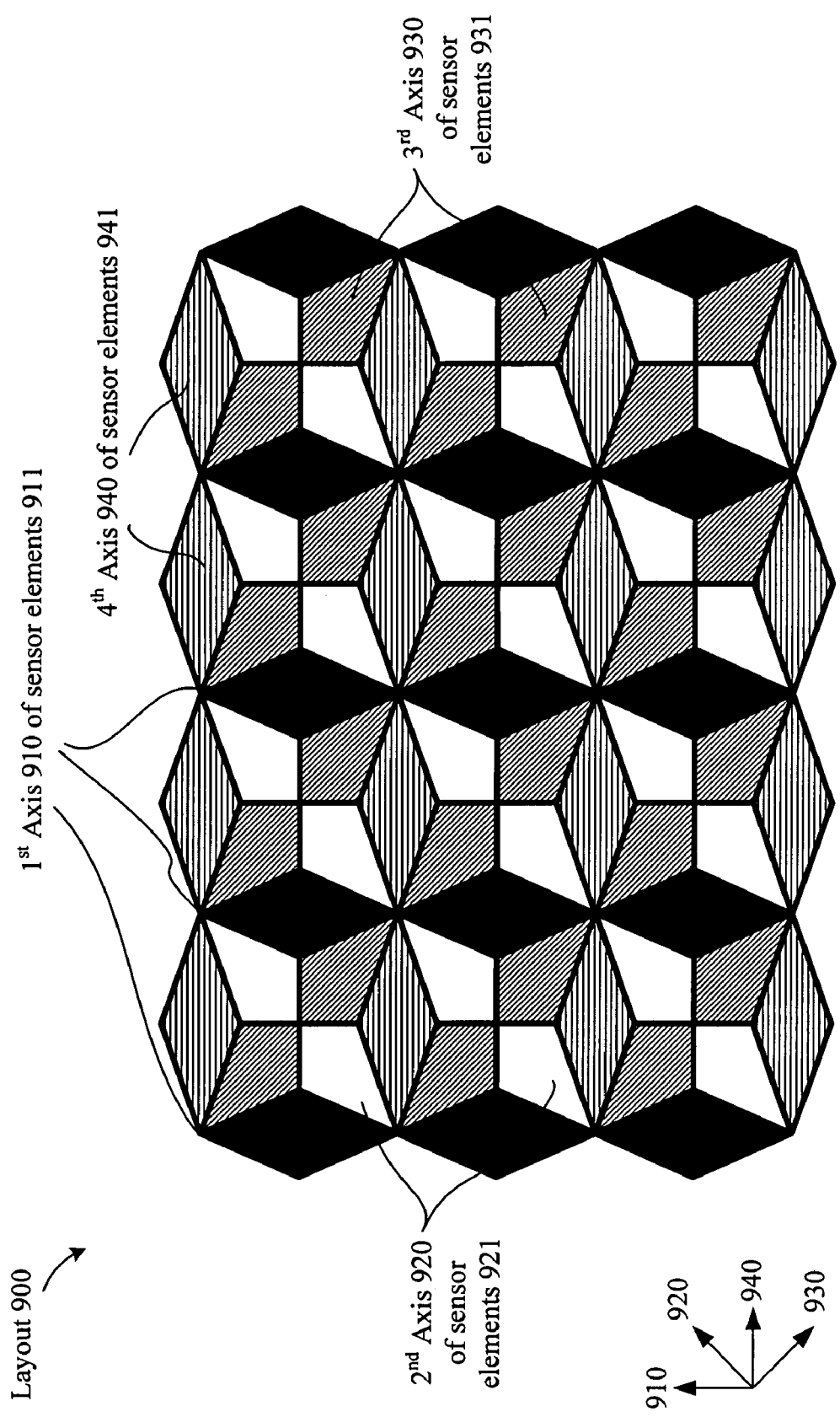
FIG. 9 illustrates one embodiment of a layout for quad-axial sensing.

FIG. 9 illustrates one embodiment of a layout 900 for quad-axial sensing. Layout 900 includes four independent sensing axes, namely first axis 910, second axis 920, third axis 930, and fourth axis 940. Each axis of sensor elements is illustrated independent of the others in FIG. 10. The first axis 910 includes multiple sensors 911 disposed along the first axis 910, illustrated as black, symmetrical diamonds. The first axis 910 is disposed on a vertical axis. Columns of the sensor elements 911 are coupled to interconnecting traces 912 (only illustrated in FIG. 10), which are coupled to the processing device 210. Since the sensor elements 911 are disposed in columns within a rectangular shape, all of the columns are complete columns; for example, each complete column includes three sensor elements. Alternatively, other numbers of sensor elements can be used in the complete columns of the first axis 910.

The second axis 920 includes multiple sensors 921 disposed along the second axis 920, illustrated as white, non-symmetrical diamonds. The second axis 920 is disposed on a diagonal with respect to the vertical axis (e.g., approximately 45° from the vertical axis). Diagonal columns of the sensor elements 921 are coupled to interconnecting traces 922 (only illustrated in FIG. 10), which are coupled to the processing device 210. Since the sensor elements 921 are also disposed diagonally within the rectangular shape, some of the diagonal columns of sensor elements 921 are partial columns; for example, each complete diagonal column of the second axis 920 includes six sensor elements, and the partial columns include four sensor elements, or two sensor elements. Alternatively, other numbers of sensor elements can be used in the complete and partial diagonal columns of the second axis 920.

The third axis 930 includes multiple sensors 931 disposed along the third axis 930, illustrated as diagonally-hashed, non-symmetrical diamonds. The third axis 930 is disposed on a diagonal axis with respect to the vertical axis (e.g., approximately 45° from the vertical axis). Diagonal columns of the sensor elements 931 are coupled to interconnecting traces 932 (only illustrated in FIG. 10), which are coupled to the processing device 210. Since the sensor elements 931 are also disposed diagonally within the rectangular shape, some of the diagonal columns of sensor elements 931 are partial columns; for example, each complete diagonal column of the third axis 930 includes six sensor elements, and the partial columns include four sensor elements, or two sensor elements. Alternatively, other numbers of sensor elements can be used in the complete and partial diagonal columns of the third axis 930.

The fourth axis 940 includes multiple sensors 941 disposed along the fourth axis 940, illustrated as horizontally-hashed, symmetrical diamonds. The fourth axis 940 is disposed on a horizontal axis. Rows of the sensor elements 941 are coupled to interconnecting traces 942 (only illustrated in FIG. 10), which are coupled to the processing device 210. Since the sensor elements 931 are disposed in rows within the rectangular shape, all of the rows are complete rows; for example, each complete row includes four sensor elements. Alternatively, other numbers of sensor elements can be used in the complete rows of the fourth axis 940.

It should be noted that although the layout 900 includes four axes, one disposed on a horizontal axis, one disposed on a vertical axis, and two diagonal axes, other configurations are possible, such as four diagonal axes. As described above, since there are four axes, the nominal angle of intersection is approximately 45°; however, other angles of intersection may be used. Also, as described above, since the layout 900 includes four axes, the processing device 210 may be configured to detect multiple (e.g., two or more) substantially simultaneous touches and resolve at least three touches within the plane of the touch-sensor device.

Figure 10:
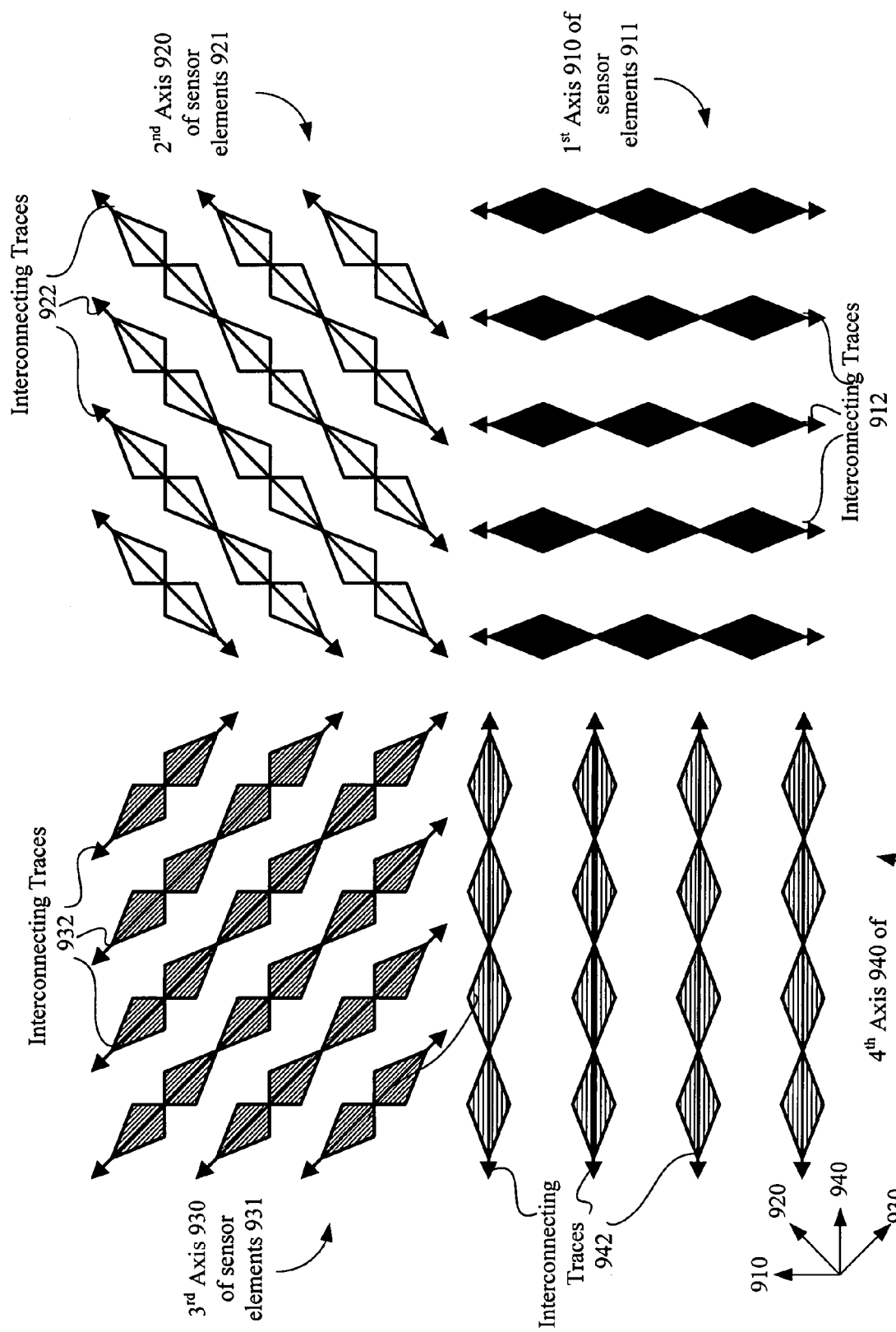
FIG. 10 illustrates the sensing axes for the quad-axial sensing layout of FIG. 9.

The sensor elements 911, 921, 931, and 941 of FIG. 9 have columns and rows of symmetrical and non-symmetrical diamond shapes. However, lines of other tessellated shapes may be used, such as triangles (illustrated in FIGS. 11 and 12). As seen in FIGS. 9 and 10 the interconnecting traces between the sensor elements using these shapes can be reduced or eliminated in some cases at or near the vertices of the sensor elements. Layout 900 can be implemented using both low and high sheet-rho materials, however, because the interconnecting traces between the sensors is small or negligible, the layout 900 may be beneficial for implementation with high sheet-rho materials, as described above.

Figure 11:
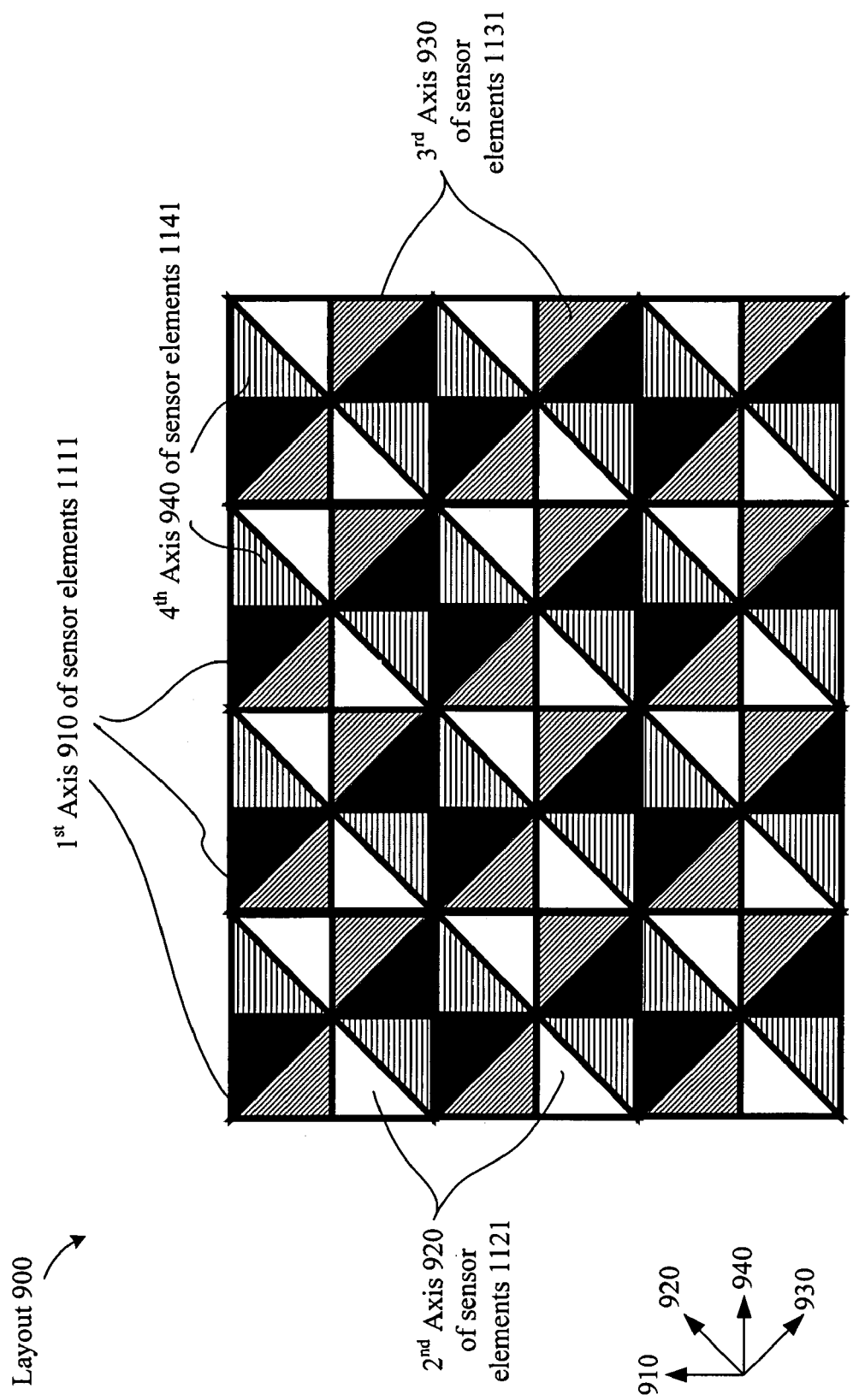
FIG. 11 illustrates another embodiment of a layout for quad-axial sensing.
Figure 12:
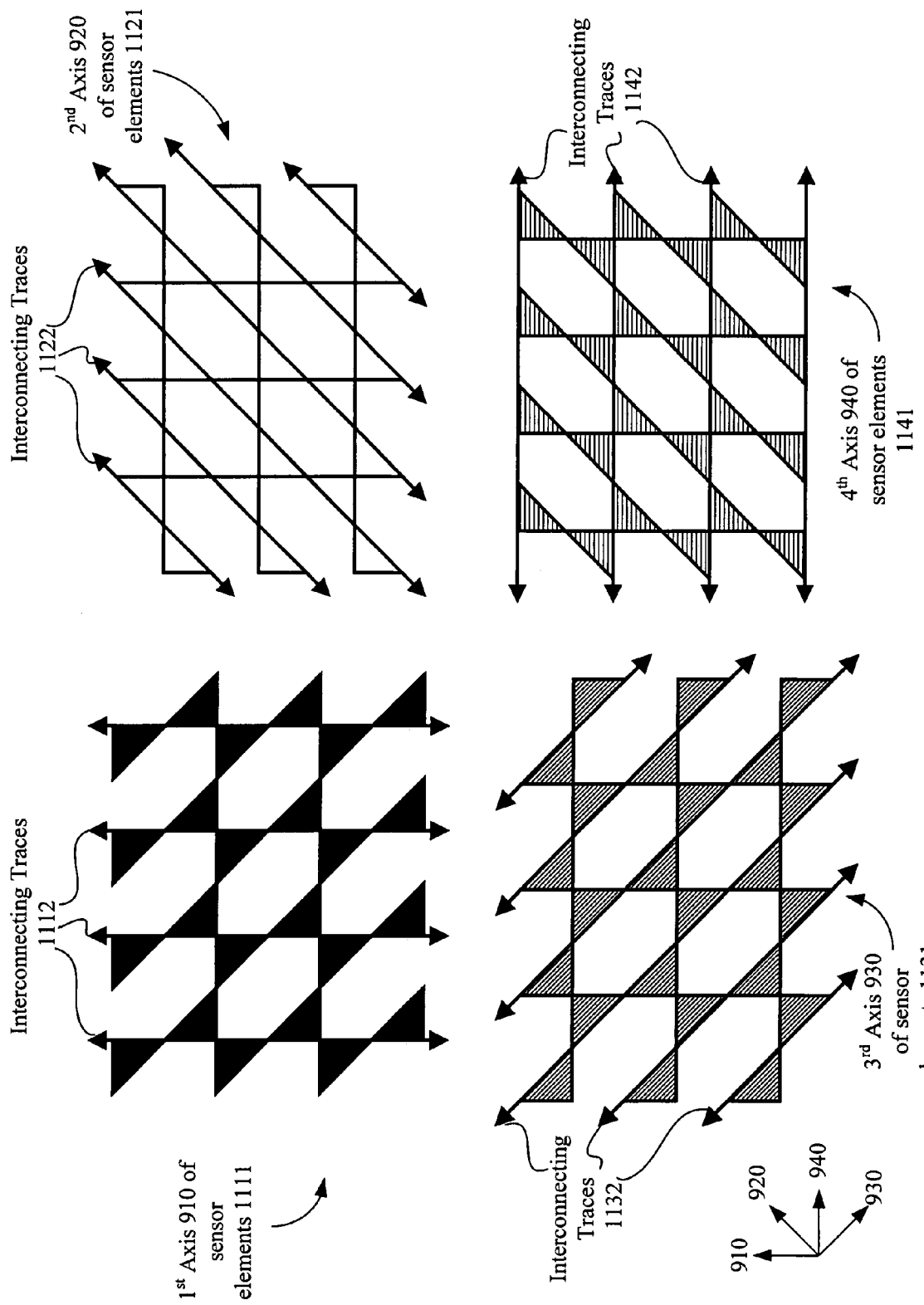
FIG. 12 illustrates the sensing axes for the quad-axial sensing layout of FIG. 11.

FIG. 11 illustrates another embodiment of a layout 1100 for quad-axial sensing. Layout 1100 includes the same four independent sensing axis of the layout 900, namely first axis 910, second axis 920, third axes 930, and fourth axis 940. Each axis of sensor elements is illustrated independent of the others in FIG. 12. The sensor elements of the four sensing axes of the layout 1100 differ from the sensor elements of the layout 900. Each of the sensing axes of the layout 1100 includes a line of tessellated shapes, including alternating triangular sensor elements. In particular, the first axis 910 includes multiple sensor elements 1111 disposed along the first axis 910 (e.g., vertical axis), illustrated as triangular sensor elements alternately disposed about parallel lines along the first axis 910. The second axis 920 includes multiple sensor elements 1121 disposed along the second axis 920 (e.g., approximately 45° from the vertical axis), illustrated as triangular sensor elements alternately disposed about parallel lines along the second axis 920. The third axis 930 includes multiple sensor elements 1131 disposed along the second axis 930 (e.g., approximately 45° from the vertical axis), illustrated as triangular sensor elements alternately disposed about parallel lines along the third axis 930. The fourth axis 940 includes multiple sensor elements 1141 disposed along the fourth axis 940 (e.g., horizontal axis), illustrated as triangular sensor elements alternately disposed about parallel lines along the fourth axis 940. Each of the lines of sensor elements of each axis are connected to interconnecting traces 1112, 1122, 1132, and 1142, respectively (illustrated in FIG. 12). The interconnecting traces 1112, 1122, 1132, and 1142 are coupled to the processing device 210. Although the tessellated sensor elements of FIG. 12 are illustrated as triangular-shaped sensor elements, other shapes and other patterns may be used.

Similarly, since the sensor elements are disposed along diagonal columns within a rectangular shape, some of the diagonal columns are partial columns; for example, each complete diagonal column of the second and third axes 920 and 930 includes six sensor elements, and the partial columns include four sensor elements, or two sensor elements. Alternatively, other numbers of sensor elements can be used in the complete and partial diagonal columns of the second and third axes 920 and 930. The partial diagonal columns of the layout 1100, as well as the diagonal columns (or rows) of the layouts 900 and 1100 may be coupled together to reduce the number of interconnecting traces to the processing device 210. In one embodiment, the diagonal columns are coupled together as virtual cylinders. For example, the second and fourth axes 920 and 940 have partial columns of four and two sensor elements. The partial columns of two sensor elements may be coupled to the other-partial columns of four sensor elements.

Figure 13:
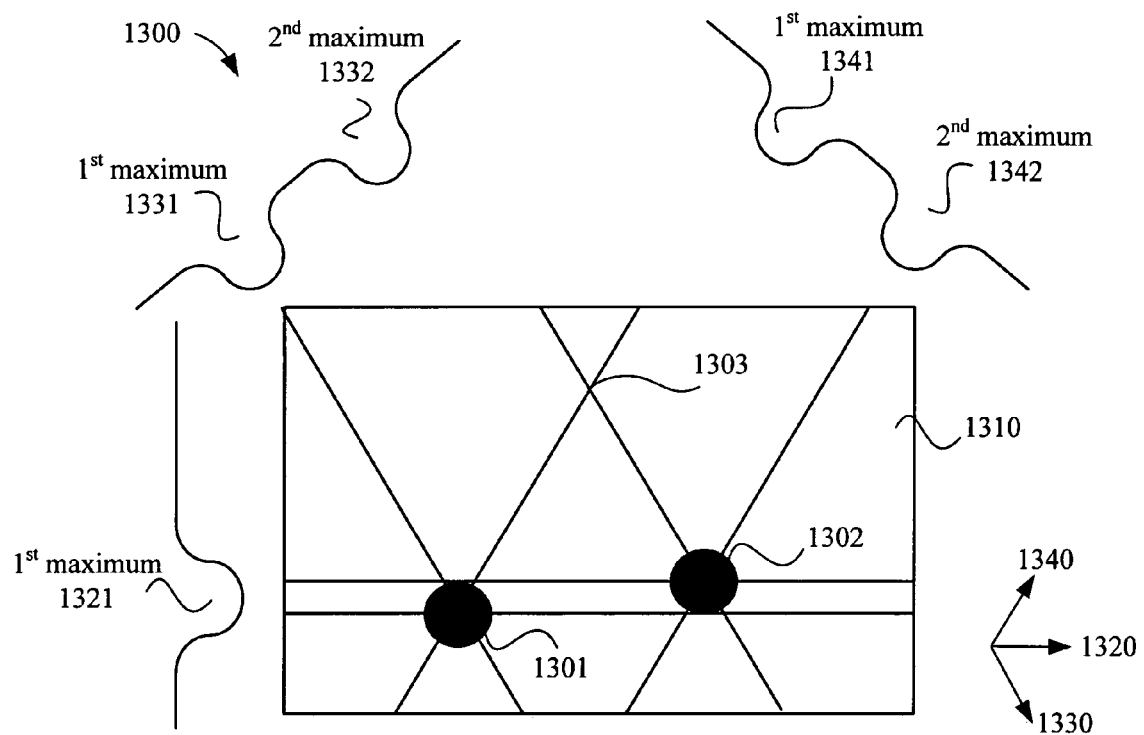
FIG. 13 illustrates a detection profile of two touches on a tri-axial touchpad.

FIG. 13 illustrates a detection profile 1300 of two touches 1301 and 1302 on a tri-axial touchpad 1310. The location of the first touch 1301 on the tri-axial touchpad 1310 is determined from the calculated centroid of additional capacitance (e.g., $1^{st}$ maximum 1321) of the scanned rows of the first axis 1320, the calculated centroid of additional capacitance (e.g., $1^{st}$ maximum 1331) of the scanned diagonal columns of the second axis 1330, and the calculated centroid of additional capacitance (e.g., $1^{st}$ maximum 1341) of the other scanned diagonal columns of the third axis 1340. If a second touch 1302 occurs following or substantially simultaneously to the first touch 1301, a second maximum (e.g., $2^{nd}$ maximum 1332 and $2^{nd}$ maximum 1342) is introduced on at least two axes. It should be noted, however, that a second maximum is not introduced on the first axis 1320 because the first and second touches 1301 and 1302 are of such proximity relative to that axis that they project only a single maximum in the first axis 1320. Even in this specific touch combination of the two touches sharing a common axis (i.e., generating only a single maximum across multiple touches), the respective locations relative to the common axis can be resolved due to the intersections of maxima on all three of the axes. The location of the first touch 1301 and second touch 1302 on the tri-axial touchpad 1310 is determined from the calculated centroid of additional capacitance (e.g., $1^{st}$ maximum 1321) of the scanned rows of the first axis 1320, the calculated centroid of additional capacitance (e.g., $2^{nd}$ maximum 1332) of the scanned diagonal columns of the second axis 1330, and the calculated centroid of additional capacitance (e.g., $2^{nd}$ maximum 1342) of the other scanned diagonal columns of the third axis 1340. Unlike the conventional touchpad, the locations of the two substantially simultaneous touches 1301 and 1302 can be resolved. An "actual" touch is determined where there are three intersecting maxima of the three axes 1320, 1330, and 1340. For example, at location 1303 no touch is located even though there are two intersecting maxima (e.g., $2^{nd}$ maximum 1332 and $2^{nd}$ maximum 1341 in the second and third axes 1330 and 1340, respectively). Intersections of two or less maxima detected on two or less axes can be rejected as not being potential touches. From the maxima of three axes, it is possible to infer the locations of the two substantially simultaneous touches 1301 and 1302. To properly resolve the locations of touches sharing a common axis, the location information from the common axis may be used to validate the presence of a touch with the actual location determined by the calculated intersection point of the sensed maxima from the remaining two sensing axes.

Figure 14:
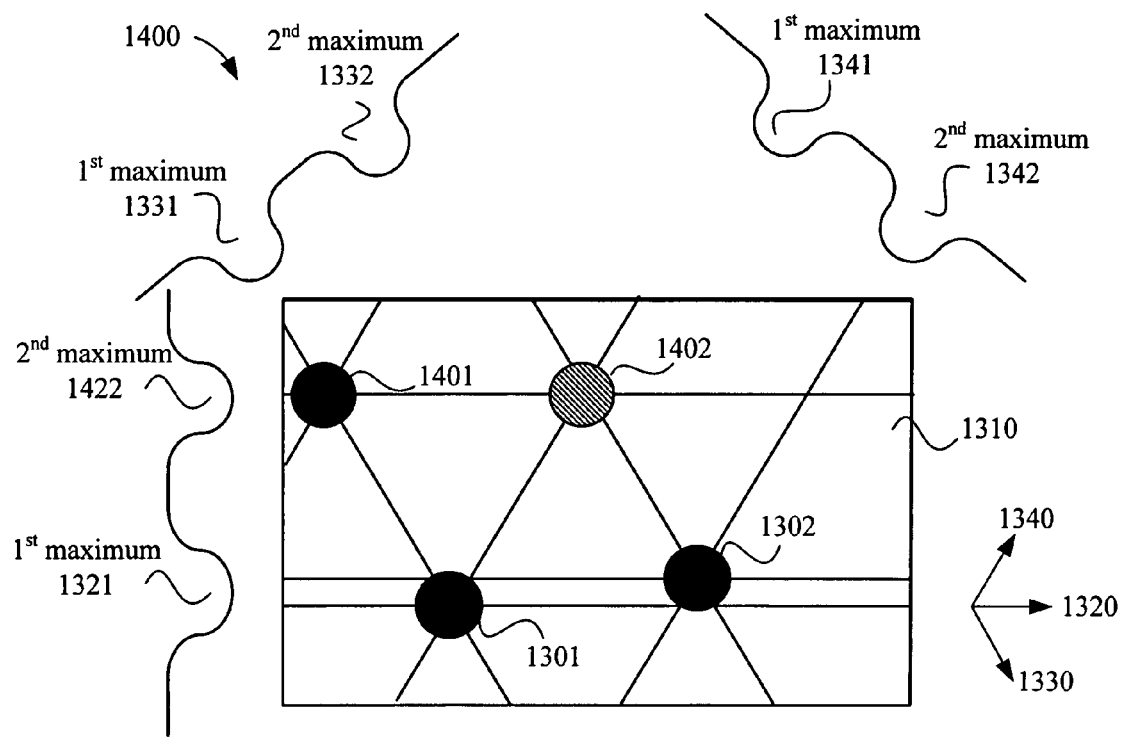
FIG. 14 illustrates a detection profile of the tri-axial touchpad of FIG. 13 having the presence of a ghost touch when a third touch is present on a tri-axial touchpad.

FIG. 14 illustrates a detection profile 1400 of three touches 1301, 1302, and 1401 on the tri-axial touchpad 1310. The detection profile 1400 includes the same two substantially simultaneous touches 1301 and 1302 of the detection profile 1300 of FIG. 13, and further includes a third touch 1401 that is substantially simultaneous to the other two touches. The third touch 1401 introduces a "ghost" touch 1402 (illustrated as a hashed circle) at the intersection of three maxima of the three axes 1320, 1330, and 1340. In particular, second maximum 1422 is introduced by the "actual" touch 1401 on the first axis 1320. The second maximum 1422, however, creates an intersection of three maxima at the "ghost" touch location 1402 (e.g., $2^{nd}$ maximum 1422, $2^{nd}$ maximum 1332, and $1^{st}$ maximum 1341).

However, it should be noted that a "ghost" touch is only possible when three or more actual touches are present on the touch sensing surface. While it remains possible to detect and resolve locations of more than two substantially simultaneous touches, for example a third:touch on or near sensing maxima 1321 in FIG. 13, FIG. 14 illustrates the three sensing axes 1320, 1330, and 1340 as a worst case that is limited to resolve the locations of at least two substantially simultaneous touches on the tri-axial touchpad 1310. For example, if the third touch 1401 was positioned lower such that the $2^{nd}$ maximum 1422 was closer to $1^{st}$ maximum 1321, the three maxima would not intersect at 1402. Thus the presence of a third touch without creation of an apparent fourth touch could be used to resolve the location of three touches. Accordingly, the tri-axial touchpad 1310 is configured to guarantee the detection of and resolution of any two substantially simultaneous touches. Also, since the presence of one or two ghost touch points, as indicated by location 1402 in FIG. 14, is always generated as a paired element with a third actual touch, the presence of exactly three sets of 3-axis intersections indicates the presence and location of three substantially simultaneous touches.

In another embodiment, three substantially simultaneous touches 1301, 1302, and 1401 can be resolved using a quad-axial touchpad, such as described in FIGS. 9-12. The intersection of four maxima of the four axes can be used to resolve the locations of the "actual" touches (e.g., 1301, 1302, and 1401), and reject the "ghost" locations (e.g., 1402) as possible touches.

It should be noted that in a conventional XY row/column sensing device, the location of a touch is determined by the intersection of sensed maxima on the rows and the columns. When using a tri-axial sensing device, a touch may be declared when sensed maxima from all three axes intersect. If the maxima are found only at the intersection of two of the three axes, the intersection of the two axes can be properly rejected as a possible touch. Similarly, when using a quad-axial sensing device, a possible touch may be declared when sensed maxima from all four axes intersect. If the maxima are found only at the intersection of two or three of the four axes, the intersection of the two or three axes indicates a non-touch location and can be properly rejected as a possible touch. However, just as the XY touchpad can yield invalid combinations when greater than one touch is present, a tri-axial touchpad and a quad-axial touchpad can yield invalid combinations (i.e., ghost touches) when more than two, and more than three touches are present on the respective touchpads.

Figure 15:
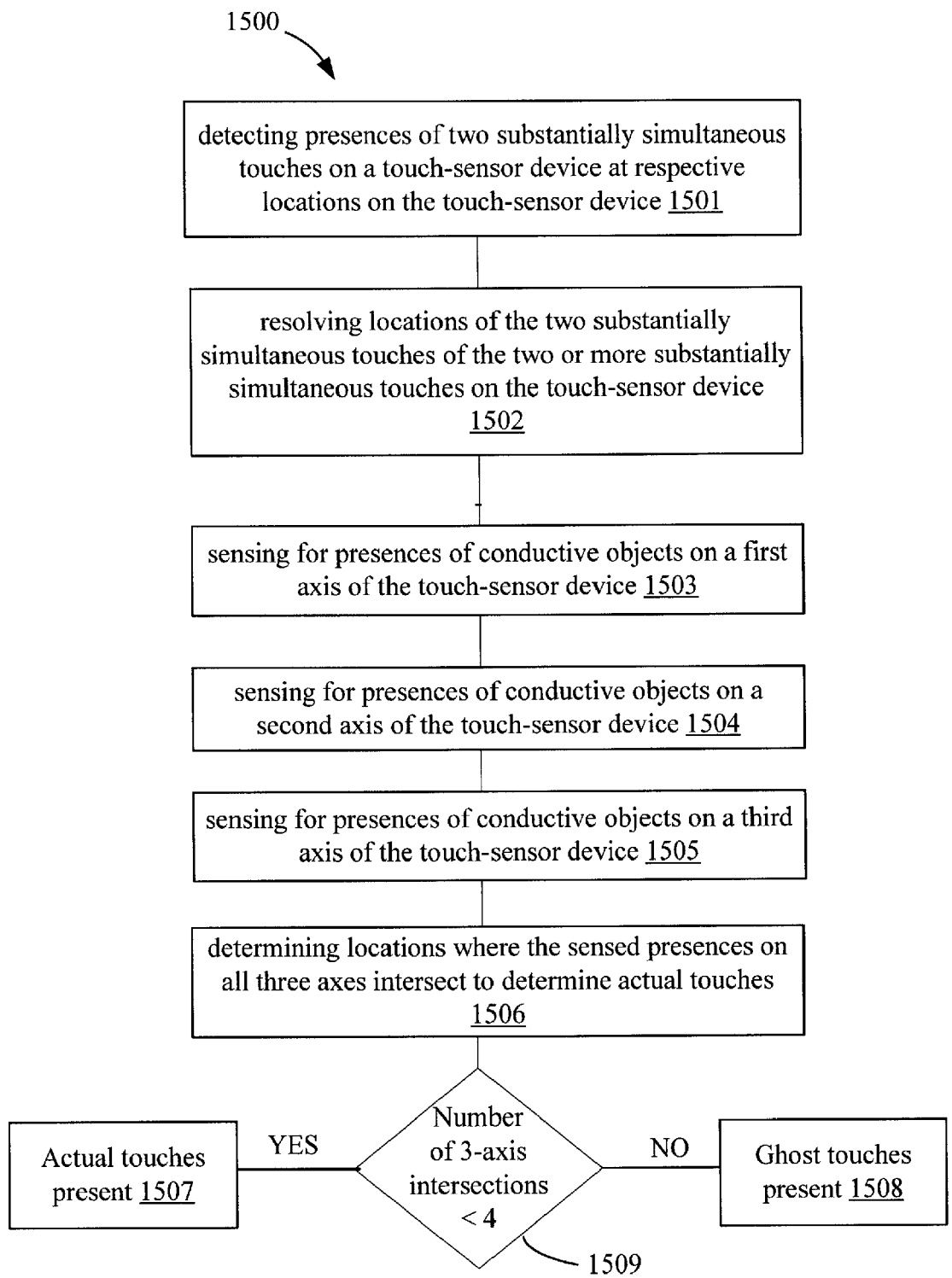
FIG. 15 illustrates a flowchart of one embodiment of method for resolving locations of two substantially simultaneous touches on a touch-sensor device.

FIG. 15 illustrates a flowchart of one embodiment of method 1500 for resolving locations of two substantially simultaneous touches on a touch-sensor device. The method 1500 includes, first, detecting presences of two substantially simultaneous touches on the touch-sensor device at respective locations, operation 1501, and resolving locations of the two substantially simultaneous touches on the touch-sensor device, operation 1502. It should be noted that the operation of resolving locations of the two substantially simultaneous touches may be done without the use of an APA array in the touch-sensor device.

The operation of resolving locations of the two or more substantially simultaneous touches includes sensing for presences of conductive objects on each of the three axes, operations 1503-1505, and determining locations where the sensed presences on all three axes intersect to determine actual touches, operation 1506. The method also includes determining whether the number of three-axis intersections (e.g., a maximum is present for each axis at one intersecting location) is less than four, operation 1509. If the number of three-axis intersections is less than four, then the locations that have three-axis intersections are all actual touches, and the locations of all detected, actual touches can be resolved, operation 1507. However, if the number of three-axis intersections is greater than three, then one or more ghost touches are present on the touch-sensor device; operation 1508. As such, not all of the detected touches can be resolved. In one embodiment, the method includes ignoring the detected touches when a ghost touch is present on the touch-sensor device in operation 1508. In another embodiment, the method 1500 includes detecting three or more substantially simultaneous touches and resolving at least two locations of the three or more substantially simultaneous touches on the touch-sensor device (e.g., tri-axial touchpad).

In another embodiment, the method includes detecting and resolving the locations of three substantially simultaneous touches on a touch-sensor device (e.g., quad-axial touchpad) at respective locations, and resolving locations of the three substantially simultaneous touches. In this embodiment, the method includes determining a number of four-axis intersections (e.g., a maximum is present for each axis at one intersecting location) on the touch-sensor device to determine if a ghost touch is present on the touch-sensor device. If the number of four-axis intersections is less than five, then the four-axis intersections are determined to be actual touches, and the corresponding locations may be resolved. However, if the number of four-axis intersections is greater than four, then one or more ghost touches are present on the touch-sensor device, and the positions of the four-axis intersections cannot all be resolved. The method may include ignoring the detected touches when a ghost touch is present on the touch-sensor device. Alternatively, the method may include detecting and resolving locations of a single or multiple substantially simultaneous touches on a multi-axial touch-sensor device (e.g., three, four, or five axes touch-sensor devices). It should be noted that although the embodiments herein have been described as being configured to detecting and resolving multiple substantially simultaneous touches, the embodiments described herein are also configured to detect and resolve single touches on the touch-sensor devices as well as detecting, and resolving multiple substantially sequential touches on the touch-sensor device.

As described above, the embodiments described herein may provide multi-axial scanning (e.g., three or more axes) to improve the spatial resolution of the detected locations. The embodiments may also provide the ability to resolve the locations of two or more substantially simultaneous touches without the use of an APA array. The embodiments may also provide the ability to route three axes on two layers. The embodiments also may provide layout of tri-axial and quad-axial matrices for low and high sheet-rho materials.

Embodiments of the present invention, described herein, include various operations. These operations may be performed by hardware components, software, firmware, or a combination thereof. As used herein, the term "coupled to" may mean coupled directly or indirectly through one or more intervening components. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Certain embodiments may be implemented as a computer program product that may include instructions stored on a machine-readable medium. These instructions may be used to program a general-purpose or special-purpose processor to perform the described operations. A machine-readable medium includes any mechanism for storing or transmitting information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; electrical, optical, acoustical, or other form of propagated signal (e.g., carrier waves, infrared signals, digital signals, or the like); or another type of medium suitable for storing electronic instructions.

Additionally, some embodiments may be practiced in distributed computing environments where the machine-readable medium is stored on and/or executed by more than one computer system. In addition, the information transferred between computer systems may either be pulled or pushed across the communication medium connecting the computer systems.

Although the operations of the method(s) herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative sense rather than a restrictive sense.

What is claimed is:

1. A method, comprising:
    detecting presences of a plurality of substantially simultaneous touches on a touch-sensor device at respective locations on a touch-sensitive surface of the touch-sensor device, wherein the touch-sensor device comprises a plurality of sensor elements disposed in a first axis, a second axis, and a third axis of the touch-sensitive surface; and
    resolving locations of two substantially simultaneous touches of the plurality of substantially simultaneous touches on the touch-sensor device, wherein resolving locations comprises:
    sensing for presences of conductive objects on the first axis;
    sensing for presences of conductive objects on the second axis;
    sensing for presences of conductive objects on the third axis; and
    determining locations where the sensed presences of conductive objects intersect each of the three axes at a same intersection point of the touch-sensor device to resolve the two substantially simultaneous touches.

2. The method of claim 1, further comprising resolving locations of three substantially simultaneous touches of the plurality of substantially simultaneous touches on the touch-sensor device, wherein said resolving further comprises sensing for presences of conductive objects on a fourth axis of the touch-sensor device.

3. The method of claim 1, wherein resolving locations further comprises
    determining a number of three-axis intersections of the sensed presences of conductive objects on the touch-sensor device wherein if the number of three-axis intersections is greater than or equal to four, a ghost touch is present on the touch-sensor device, and wherein if the number of three-axis intersections is less than four, each of the three-axis intersections represent actual touches.

4. The method of claim 1, wherein resolving locations comprises resolving the locations of the two substantially simultaneous touches when the two substantially simultaneous touches share a common axis.

5. The method of claim 4, wherein resolving the locations of the two substantially simultaneous touches that share the common axis comprises:
    validating presences of the two substantially simultaneous touches using information from the common axis and two additional axes; and
    determining locations of the two substantially simultaneous touches using information from the two additional axes.

6. An apparatus, comprising:
    a first set of sensor elements disposed in a first axis of a touch-sensitive surface of a touch-sensor device;
    a second set of sensor elements disposed in a second axis of the touch-sensitive surface of the touch-sensor device;
    a third set of sensor elements disposed in a third axis of the touch-sensitive surface of the touch-sensor device; and
    a processing device coupled to the first, second, and third sets of sensor elements, wherein the processing device is configured to sense for presences of conductive objects on the first axis, second axis, and third axis, and to determine locations where the sensed presences of the conductive objects intersect each of the three axes at a same intersection point to resolve locations of one or more touches on the touch-sensor device.

7. The apparatus of claim 6, wherein the sensor elements of the first, second and third sets of sensor elements have a hexagonal shape.

8. The apparatus of claim 6, wherein the sensor elements of the first, second and third sets of sensor elements have a diamond shape.

9. The apparatus of claim 6, wherein the first, second, and third sets are disposed having approximately 60 degrees between each axis.

10. The apparatus of claim 6, wherein the sensor elements of the first, second and third sets of sensor elements each include one or more lines of tessellated shapes.

11. The apparatus of claim 6,
    wherein the processing device is configured to detect presences of two substantially simultaneous touches on the sensor elements of the first, second, and third sets of sensor elements, and
    wherein the processing device is configured to resolve the locations of the two substantially simultaneous touches on the first, second, and third sets of sensor elements.

12. The apparatus of claim 11, wherein the processing device is configured to resolve the locations of the two substantially simultaneous touches when the two substantially simultaneous touches share a common axis.

13. The apparatus of claim 6,
    wherein the processing device is configured to detect presences of two or more substantially simultaneous touches on the sensor elements of the first, second, and third sets of sensor elements, and
    wherein the processing device is configured to resolve the locations of at least two substantially simultaneous touches of the two or more substantially simultaneous touches on the first, second, and third sets of sensor elements.

14. The apparatus of claim 6, further comprising a fourth set of sensor elements disposed in a fourth axis.

15. The apparatus of claim 14, wherein the first, second, third, and fourth sets are disposed having approximately 45 degrees between each axis.

16. The apparatus of claim 14,
wherein the processing device is configured to detect presences of three substantially simultaneous touches on the sensor elements of the first, second, third, and fourth sets of sensor elements, and
wherein the processing device is configured to resolve the locations of the three substantially simultaneous touches on the first, second, third, and fourth sets of sensor elements.

17. The apparatus of claim 14,
wherein the processing device is configured to detect presences of three or more substantially simultaneous touches on the sensor elements of the first, second, third, and fourth sets of sensor elements, and
wherein the processing device is configured to resolve the locations of at least three substantially simultaneous touches of the three or more substantially simultaneous touches on the first, second, third, and fourth sets of sensor elements.

18. An apparatus, comprising a tri-axial touch sensor device configured to resolve locations of two substantially simultaneous touches on a touch-sensitive surface of the tri-axial touch sensor device, wherein the tri-axial touch sensor device comprises a processing device configured to sense for presences of conductive objects on a first axis, second axis, and third axis, and to determine locations where the sensed presences of the conductive objects intersect each of the three axes at a same intersection point to resolve locations of the two substantially simultaneous touches on the tri-axial touch-sensor device.

19. The apparatus of claim 18, wherein the touch sensor device is a touch-sensor pad.

20. The apparatus of claim 18, wherein the touch-sensor device is a touch screen.

21. The apparatus of claim 18, wherein the tri-axial sensor device comprises a tri-axial hexagonal sensor array configured with dual-touch resolution.

22. The apparatus of claim 21, wherein the tri-axial hexagonal sensing array is disposed on one or more substrates with low-sheet-rho material.

23. The apparatus of claim 18, wherein the tri-axial sensor device comprises a tri-axial diamond sensor array configured with dual-touch resolution.

24. The apparatus of claim 23, wherein the tri-axial diamond sensor array is disposed on one or more substrates with high-sheet-rho material.

25. The apparatus of claim 18, wherein the tri-axial sensor device comprises a tri-axial sensor array routed on two layers.

26. The apparatus of claim 18, wherein the touch-sensor device is configured to detect presences of any of three substantially simultaneous touches.

27. The apparatus of claim 18, wherein the tri-axial touch sensor device is configured to resolve locations of two substantially simultaneous touches that share a common axis.

28. An apparatus, comprising:
a touch-sensor device;
means for detecting presences of a plurality of substantially simultaneous touches on sensor elements of a touch-sensitive surface of the touch-sensor device at respective locations on the touch sensor device; and
means for resolving locations of two substantially simultaneous touches of the plurality of substantially simultaneous touches on the touch-sensor device, wherein said means for resolving senses for presences of conductive objects on a first axis, a second axis, and third axis, and determines locations where the sensed presences of conductive objects intersect each of the three axes at a same intersection point to resolve the two substantially simultaneous touches on the touch-sensor device.

29. The apparatus of claim 28, further comprising means for resolving locations of three substantially simultaneous touches of the plurality of substantially simultaneous touches on the touch-sensor device.

30. The apparatus of claim 28, wherein said means for resolving resolves the locations of the two substantially simultaneous touches on the touch-sensor device without an all-points-addressable (APA) array of touch sensor elements in the touch-sensor device.

31. The apparatus of claim 28, further comprising means for resolving locations of the two substantially simultaneous touches when the two substantially simultaneous touches share a common axis.

\* \* \* \* \*